(12) United States Patent
Furuhata

(10) Patent No.: US 8,882,222 B2
(45) Date of Patent: Nov. 11, 2014

(54) LIQUID JETTING APPARATUS AND RECORDING METHOD USING THE SAME

(71) Applicant: Yoshiharu Furuhata, Nagoya (JP)

(72) Inventor: Yoshiharu Furuhata, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/218,235

(22) Filed: Mar. 18, 2014

(65) Prior Publication Data

US 2014/0292860 A1 Oct. 2, 2014

(51) Int. Cl.
*B41J 2/15* (2006.01)
*B41J 2/07* (2006.01)

(52) U.S. Cl.
CPC ............................. *B41J 2/07* (2013.01)
USPC ................................ 347/12; 347/41

(58) Field of Classification Search
None
See application file for complete search history.

(56) References Cited

U.S. PATENT DOCUMENTS

| | | | |
|---|---|---|---|
| 4,559,543 A | 12/1985 | Toganoh et al. | |
| 5,091,737 A | 2/1992 | Toganoh et al. | |
| 7,922,287 B2 * | 4/2011 | Noguchi | 347/40 |
| 8,382,232 B2 * | 2/2013 | Silverbrook | 347/19 |
| 8,733,895 B2 * | 5/2014 | Tanaka et al. | 347/43 |

| | | |
|---|---|---|
| 2002/0024557 A1 | 2/2002 | Matsumoto et al. |
| 2009/0051717 A1 | 2/2009 | Kuwahara |
| 2009/0278882 A1 | 11/2009 | Yoshida et al. |
| 2010/0053246 A1 | 3/2010 | Kasahara et al. |
| 2010/0118318 A1 | 5/2010 | Fuse et al. |
| 2011/0316910 A1 | 12/2011 | Azuma et al. |
| 2012/0206525 A1 | 8/2012 | Tanase et al. |

FOREIGN PATENT DOCUMENTS

| | | |
|---|---|---|
| EP | 1 176 019 | 1/2002 |
| JP | 0438589 | 6/1992 |
| JP | 2001-001510 | 1/2001 |
| JP | 4350327 | 7/2009 |
| JP | 2010-099893 | 5/2010 |

OTHER PUBLICATIONS

Extended European Search Report for EP Application No. 14160277.1 dated Jul. 30, 2014.

* cited by examiner

*Primary Examiner* — Lamson Nguyen
(74) *Attorney, Agent, or Firm* — Frommer Lawrence & Haug LLP

(57) ABSTRACT

There is provided a liquid jetting apparatus, including: a head unit and a controller. The controller is configured to: form a plurality of dot-rows by nozzles in a first range, and form the same dot-rows by nozzles in a second range; switch the nozzles jetting the liquid, between the nozzles in the first and second ranges, at the time of forming the dot-rows; narrow a switching range to be narrower than the first and second ranges; set the switching positions such that there are not less than three switching positions in the switching range; and set the switching range such that the switching range differs for the two dot-rows which are adjacent in the direction of intersection.

8 Claims, 21 Drawing Sheets

AN INK-JET HEAD OF THE
PRESENT EMBODIMENT

PAPER WIDTH DIRECTION
(NOZZLE ROW DIRECTION)

GRID POINTS

TEXTURED

BEADS

SMALL GRID

LARGE GRID

SMALL CHEQUER

LARGE CHEQUER

RHOMBUS FRAME ONLY

RHOMBUS HIGHLIGHTED

| EXAMPLE 1 | AMOUNT OF SHIFT (MISALIGNMENT) ($\mu$m) | | | |
|---|---|---|---|---|
| | -40 | 0 | 40 | TOTAL |
| ++ | 85 | 106 | 81 | 272 |
| + | 28 | 8 | 28 | 64 |
| - | 1 | 0 | 5 | 6 |
| × | 0 | 0 | 0 | 0 |

EXAMPLE 1

| EXAMPLE 2 | AMOUNT OF SHIFT (MISALIGNMENT) (μm) | | | |
|---|---|---|---|---|
| | -40 | 0 | 40 | TOTAL |
| ++ | 69 | 106 | 56 | 231 |
| + | 40 | 8 | 48 | 96 |
| - | 5 | 0 | 8 | 13 |
| × | 0 | 0 | 2 | 2 |

EXAMPLE 2

| EXAMPLE FOR COMPARISON | AMOUNT OF SHIFT (MISALIGNMENT) (μm) | | | |
|---|---|---|---|---|
| | -40 | 0 | 40 | TOTAL |
| ++ | 70 | 100 | 51 | 221 |
| + | 42 | 14 | 43 | 99 |
| - | 2 | 0 | 16 | 18 |
| × | 0 | 0 | 4 | 4 |

COMPARATIVE EXAMPLE

LIQUID JETTING APPARATUS AND RECORDING METHOD USING THE SAME

The present application claims priority from Japanese Patent Application No. 2013-072996, filed on Mar. 29, 2013, the disclosure of which is incorporated herein by reference in its entirety.

BACKGROUND OF THE INVENTION

1. Field of the Invention

The present invention relates to a liquid jetting apparatus such as an ink-jet printer and a recording method using the liquid jetting apparatus.

2. Description of the Related Art

A printer including an ink-jet head of a line-type in which a plurality of head units have been combined, has hitherto been known. These ink-jet heads include the plurality of head units. In each of the head units, a plurality of nozzles are arranged in rows in a width direction of a recording medium. The plurality of head units is arranged in a zigzag form along the width direction of the recording medium.

Two head units of the plurality of head units, which are adjacent in the width direction of the recording medium, are arranged such that end portions of the nozzle rows of the two head units overlap with each other. Moreover, in a range in which the two nozzle rows overlap, the nozzles in the two nozzle rows are located at the same positions in a nozzle-row direction, respectively. The range in which the nozzle rows of the two head units overlap is referred to as "an overlapping range", in the following description. In a case that an image is recorded onto a recording medium by using nozzles in the overlapping range, one of the two types of nozzles for which the positions in the nozzle-row direction coincide, is to be used selectively.

In the abovementioned printer, there is a possibility that the positions of two head units are misaligned relatively in the width direction of the recording medium, or in other words, in the nozzle-row direction due to an assembling error of the head units. Ideally, the positions of the nozzles in the overlapping range should be aligned in the nozzle-row direction. However, the positions of the nozzles of two types in the overlapping range are misaligned. Accordingly, a distance between the dots formed on the recording medium by one of the two types of nozzles in the overlapping range and by the other type of nozzles in the overlapping range is either narrowed or widened. Accordingly, as compared to a case in which the two head units have been assembled without an error, there appears a portion in an image recorded on the recording medium, in which a density or concentration is high (dark) locally, and a portion in which the density is low (light) locally. Therefore, even in the conventional printer, a method has been devised such that the portion in which the density is high or low locally is not conspicuous.

In a certain printer as described above, in the overlapping range of the two nozzle rows, the two types of nozzles for jetting is switched or changed at a predetermined position in the overlapping range. Moreover, the predetermined position is not fixed. The aforementioned printer is configured to adjust the predetermined positions such that the predetermined positions differ at the time of forming each of a plurality of dot-rows aligned in a transporting direction. Accordingly, even when the two head units are misaligned, a position of the portion, in which the density is high or low locally and which appears in a portion of an image formed by nozzles near the predetermined position, is dispersed.

In another printer as described above, in the entire area of the overlapping range of the two nozzle rows, the nozzles which jet the ink are switched alternately in the nozzle-row direction. Accordingly, the switching positions of the two types of nozzles are dispersed in the entire area of the overlapping range. Therefore, the portion in which the density is high or low locally is not susceptible to be conspicuous.

SUMMARY OF THE INVENTION

However, in the certain printer as described above, since the nozzle to be used is switched with one predetermined position in an overlapping range as a boundary, there is always one location where a density becomes high or low locally, in a portion of a recorded image formed by nozzles in the vicinity of the predetermined position. Therefore, that portion becomes conspicuous.

On the other hand, in another printer as described above, since the switching positions are dispersed in the overall overlapping range, the density is uniform in a portion of the image formed by the nozzles in the overlapping range. However, in a portion of the image corresponding to a non-overlapping range adjacent to the overlapping range, dots are formed by only one type of nozzles. Therefore, when the portion of the image corresponding to the overlapping range and the portion of the image corresponding to the non-overlapping range are compared, there is a difference in the density. To simplify, let us consider a case where an area of the recording paper is daubed all over the overlapping range and the non-overlapping range. If the density of the portion of the image is uniformized in the overall overlapping range, it is conspicuous in the form of a band for the portion of the image corresponding to the non-overlapping range on both sides of the overlapping range. In other words, in the printer as described above, the local change in density near the switching position which is problematic in the certain printer as described above is dispersed in the overall overlapping range and becomes inconspicuous, but conversely, the difference in density between the overlapping range and the non-overlapping range becomes conspicuous.

An object of the present invention is to prevent degradation of image quality due to the local change in density in the portion of the image corresponding to the overlapping range of the nozzle row, which is caused due to a misalignment of positions in the nozzle-row direction of the two head units, or a degradation of the image quality due to the difference in density between the portions of the image corresponding to the overlapping range and the non-overlapping range respectively. Moreover, in a case of an ink-jet head of a serial type, sometimes a recording paper is transported such that some of the nozzles overlap mutually at the time of a certain scanning and at the time of a subsequent scanning. An object of the present invention is to prevent similarly the degradation of image quality due to the local change in density in the portion of the image corresponding to the overlapping range of the nozzle row, or the degradation of image quality due to the difference in density between the portions of the image corresponding to the overlapping range and the non-overlapping range respectively, even in such case.

According to a first aspect of the present invention, there is provided liquid jetting apparatus configured to jet a liquid onto a recording medium, including:

a head unit in which a plurality of nozzles are aligned at an interval in a nozzle-row direction to form a nozzle row; and a controller configured to control a liquid jetting operation of the head unit to jet the liquid, from a part of the plurality of the nozzles belonging to a first range and another part of the plurality of nozzles belonging to the second range, toward the recording medium to form a plurality of dot-rows arranged in a direction of intersection which intersects the nozzle-row direction, wherein each of the dot-rows includes a switching range in which jetting the liquid from the part of the nozzles belonging to the first range and jetting the liquid another part of nozzles belonging to the second range are switched at a plurality of switching positions, wherein the plurality of dot-rows are formed so that:

the switching range in which the nozzles in the first range and the nozzles in the second range are switched, becomes narrower than the first range and the second range;

the switching positions are set such that, at the time of forming at least a part of the dot-rows in the plurality of dot-rows, there are three or more than three switching positions of the nozzles in the first range and the nozzles in the second range, in the switching range; and the switching range is set such that, the switching range differs for the two dot-rows which are adjacent in the direction of intersection.

Moreover, in the liquid jetting apparatus such as an ink-jet printer according to the present invention, the head unit may include a first head unit in which a plurality of first nozzles are aligned at the interval in the nozzle-row direction to form a first nozzle row, and a second head unit in which a plurality of second nozzles are aligned at the interval in the nozzle-row direction to form a second nozzle row, and the first head unit may include a plurality of nozzles belonging to the first range, and the second head unit includes a plurality of nozzles belonging to the second range, and the first head unit and the second head unit may be arranged at different positions in the direction of intersection, in a state of the first range of the first nozzle row and the second range of the second nozzle row being overlapped, in the direction of intersection, and positions of the plurality of first nozzles in the nozzle-row direction may coincide with positions of the plurality of second nozzles in an overlapping range in which the first nozzle row and the second nozzle row overlap in the nozzle-row direction.

A second aspect of the present invention is a method of recording by a liquid jetting apparatus.

In the present invention, 'switching the first nozzle and the second nozzle in the overlapping range' means making the ink jet from the first nozzle on one side of a predetermined position, with the predetermined position in the nozzle-row direction as a boundary, and making the ink jet from the second nozzle on the other side of the predetermined position. Moreover, the predetermined position between the first nozzle and the second nozzle which jet the ink is called as the switching position.

The present invention is applicable to an ink-jet printer. As the ink-jet printer, a case of having two head units has been described. As it will be described later, the present invention is also applicable to a liquid jetting apparatus such as an ink-jet printer of a serial type, having one head unit. Further, the present invention is also applicable to a liquid jetting apparatus other than the ink-jet printer.

According to the present invention, it is possible to prevent degradation of image quality due to the local change in density in the portion of the image corresponding to the overlapping range of the nozzle row, which is caused due to a misalignment of positions in the nozzle-row direction of the two head units, or degradation of the image quality due to the difference in density between the portions of the image corresponding to the overlapping range and the non-overlapping range respectively.

DETAILED DESCRIPTION OF THE PREFERRED EMBODIMENTS

Figure 1:
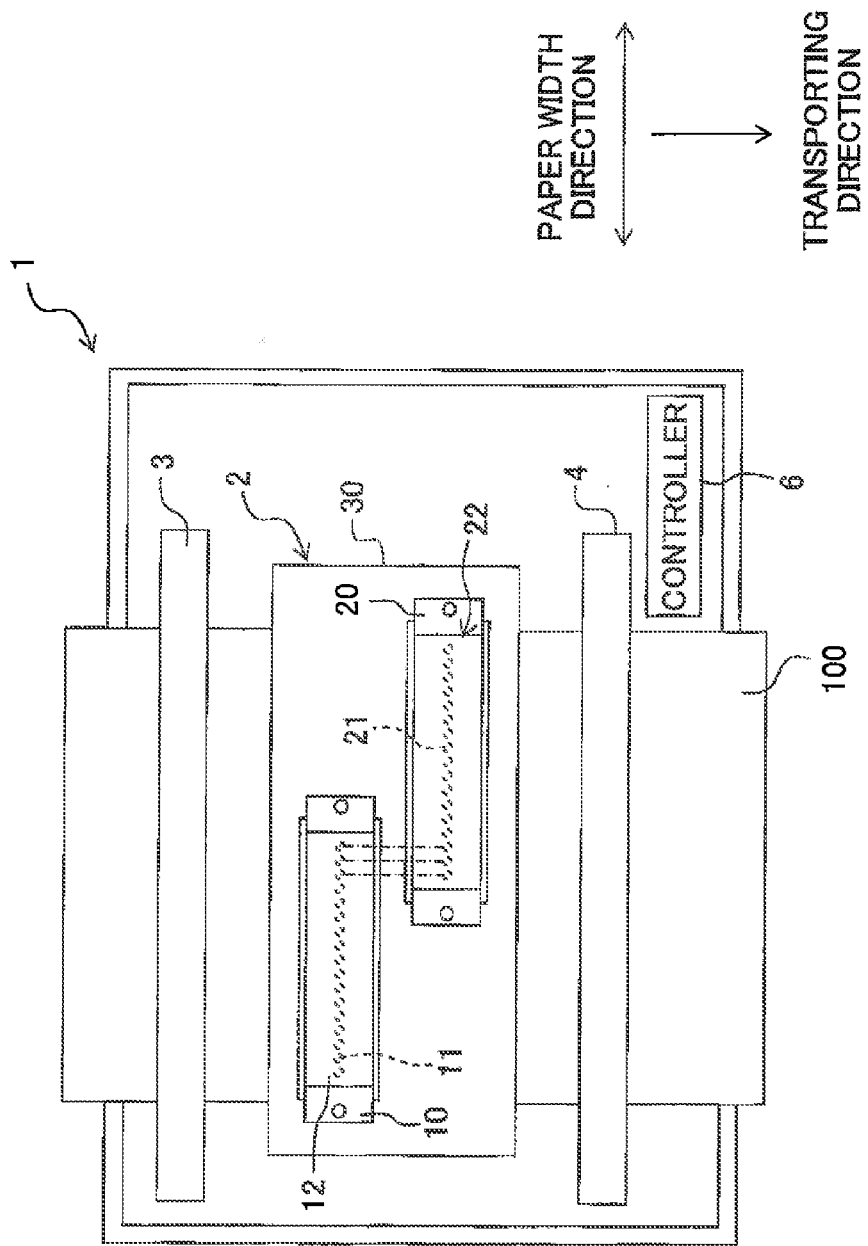
FIG. 1 is a schematic plan view of an ink-jet printer.

Next, an embodiment of the present invention will be described below. An ink-jet printer 1 includes an ink-jet head 2, two transporting rollers 3 and 4 which transport a recording paper 100 in a predetermined transporting direction. In the following description, a frontward side of a paper-plane in FIG. 1 is defined as an upper side, a rearward side of the paper-plane is defined as a downward side, and a left-right direction of FIG. 1 is defined as a left-right direction of the ink-jet printer 1.

The ink-jet head 2 jets an ink onto the transported recording paper 100, from a plurality of nozzles 11 and 21 which are arranged in rows in a paper width direction. Accordingly, the ink-jet head 2 forms a plurality of dot-rows and records an image on the recording paper 100, wherein the dot-rows are extended in the paper width direction and aligned in the transporting direction. In other words, the ink-jet head 2 is an ink-jet head of a so-called line-type ink-jet head. The ink-jet head 2 includes a first head unit 10, a second head unit 20, and a holding member 30.

The first head unit 10 includes a plurality of first nozzles 11 formed in a lower surface thereof. The plurality of first nozzles 11 is aligned at a predetermined interval along the width direction of the recording paper 100, which is orthogonal to the transporting direction. Accordingly, a first nozzle row 12 is formed. Similarly, the second head unit 20 includes a plurality of second nozzles 21 formed in a lower surface thereof. The plurality of second nozzles 21 is also aligned at the same interval along the width direction of the recording paper 100. Accordingly, a second nozzle row 22 is formed. In the present embodiment, the description is made by citing an example of a case in which the nozzle-row direction of the first and second nozzles 11, 21 is orthogonal to the transporting direction of the recording paper 100. However, the present teaching is not restricted to such an arrangement, and the nozzle-row direction of the first and second nozzles 11, 21 and the transporting direction of the recording paper 100 may also intersect at an angle other than 90 degrees. In the following description, a term 'nozzle-row direction' which is parallel to the width direction of the paper, is also used.

The first head unit 10 and the second head unit 20 are held by the holding member 30 such that the surface in which the first nozzles 11 and the second nozzles 21 are formed becomes a horizontal surface. The first head unit 10 and the second head unit 20 are arranged so that the first head unit 10 and the second head unit 20 are shifted in the transporting direction. Moreover, a right-end portion of the first nozzle row 12 of the first head unit 10 and a left-end portion of the second nozzle row 22 of the second head unit 20 are overlapping in the transporting direction. In other words, when viewed from the transporting direction, the right-end portion of the first nozzle row 12 and the left-end portion of the second nozzle row 22 are overlapping. A range of the first nozzle row 12 and the second nozzle row 22 in which the first nozzle row 12 and the second nozzle row 22 overlap partially is referred to as 'an overlapping range' in the following description. Moreover, a range in which the first nozzle row 12 and the second nozzle row 22 do not overlap is referred to as a 'non-overlapping range'.

In the overlapping range, the positions of the first nozzles 11 in the first head unit 10 in the paper width direction or the nozzle-row direction coincide with the positions of the second nozzles 21 in the second head unit 20. The two nozzles namely, the first nozzle 11 and the second nozzle 21 of which the positions in the nozzle-row direction coincide, is used for the pixels of same coordinates in image data. The two nozzles namely, the first nozzle 11 and the second nozzle 21 of which the positions in the nozzle-row direction coincide, in other words, can also be said to be two nozzles to which pixels having same coordinates in the width direction of the recording paper 100 are assigned. In the overlapping range, an ink is jetted from any one of the first nozzle 11 and the second nozzle 21, and each dot-row is formed. When the first head unit 10 and the second head unit 20 are located at ideal positions, the first nozzle 11 and the second nozzle 21 of which the positions in the nozzle-row direction coincide are capable of making the inks land at the exact same position in the paper width direction. However, when the first head unit 10 and the second head unit 20 are misaligned from the ideal positions, the inks jetted from the first nozzle 11 and the second nozzle 21 land at positions misaligned in the paper width direction corresponding to the misalignment of the first head unit 10 and the second head unit 20. In FIG. 1, three first nozzles 11 in the first nozzle row 12 and three second nozzles 21 in the second nozzle row 22 overlap in the overlapping range. However, FIG. 1 is a schematic diagram, and practically, seven first nozzles 11 and seven second nozzles 21 are overlapping as shown in FIG. 3 which will be described later.

The transporting rollers 3 and 4 are arranged on two sides respectively of the ink-jet head 2 in the transporting direction. The two transporting rollers 3 and 4 are driven to be rotated in synchronization by a transporting motor 5 (refer to FIG. 2). Accordingly, the recording paper 10 is transported in the transporting direction.

Figure 2:
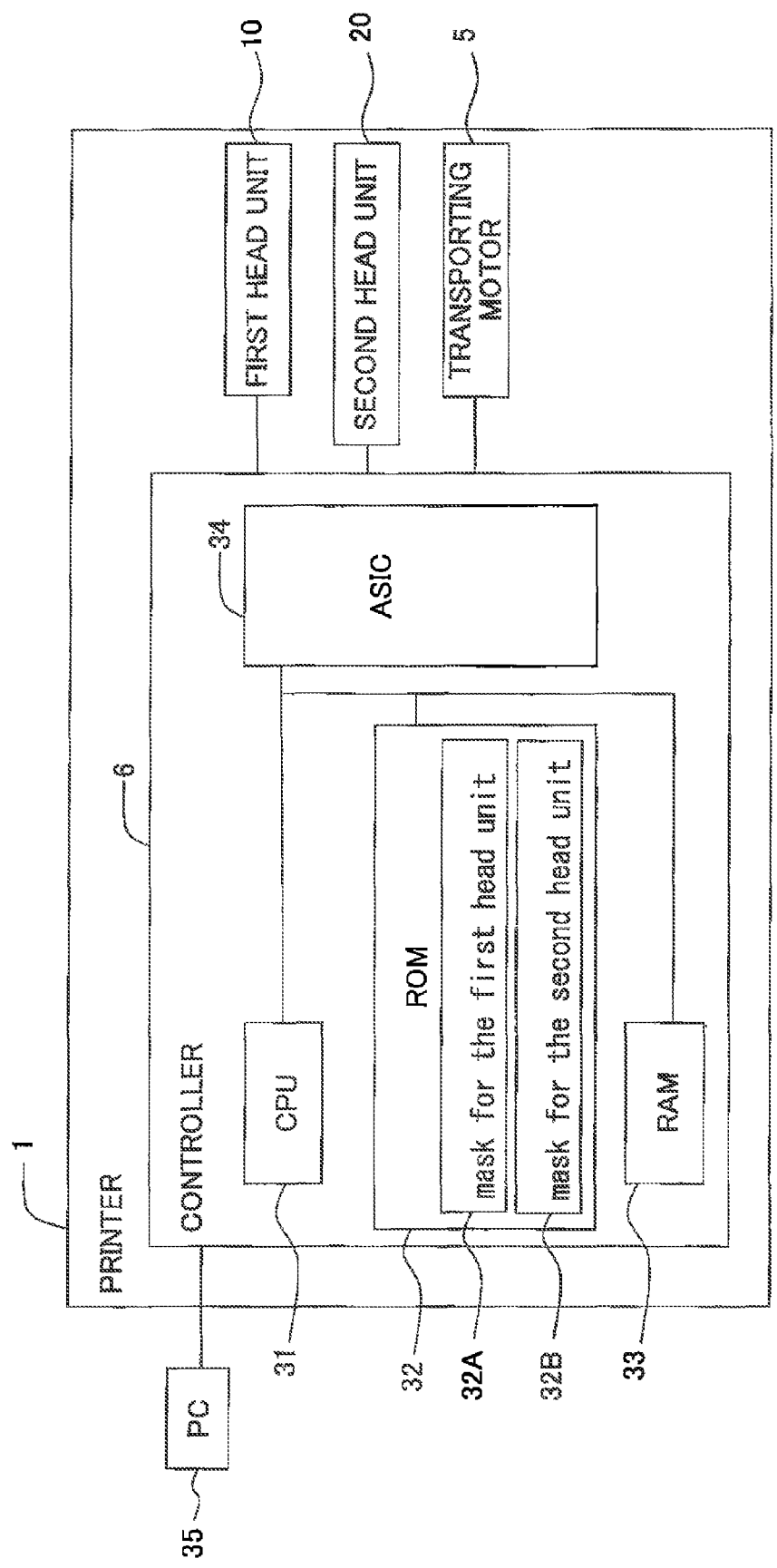
FIG. 2 is a block diagram showing schematically an electrical configuration of the ink-jet printer.

A control unit 6 shown in FIG. 2 carries out an overall control of the ink-jet printer 1. The control unit 6 includes a CPU (Central Processing Unit) 31, a ROM (Read Only Memory) 32, a RAM (Random Access Memory) 33, and an ASIC (Application Specific Integrated Circuit) 34 which are connected mutually by a bus. Moreover, the two head units namely the first head unit 10 and the second head unit 20 of the ink-jet head 2, and the transporting motor 5 which drives the two transporting rollers 3 and 4 are connected to the control unit 6.

According to various computer programs stored in the ROM 32, the control unit 6 controls various driving parts of the ink-jet printer 1 such as the first head unit 10, the second head unit 20, and the transporting motor 5, by the CPU 31 and the ASIC 34. To cite an example, as data of an image to be recorded is input from a PC (personal computer) 35, the control unit 6 controls the first head unit 10, the second head unit 20, and the transporting motor 5 based on the image data, and makes the first head unit 10 and the second head unit 20 jet inks onto the recording paper 100 that is transported by the transporting rollers 3 and 4. Accordingly, the control unit 6 records a desired image on the recording paper 100. In the abovementioned description, it has been mentioned that the control unit 6 carries out processing such as printing by a combined operation of the CPU and the ASIC. However, the present teaching is not restricted to such an arrangement. For instance, the control unit 6 may include a plurality of CPUs, and the processing may be carried out upon being shared by the plurality of CPUs. Moreover, the control unit 6 may include a plurality of ASICs, and the processing may be carried out upon being shared by the plurality of ASICs. Or, one ASIC may carry out the processing singularly.

Figure 3A:
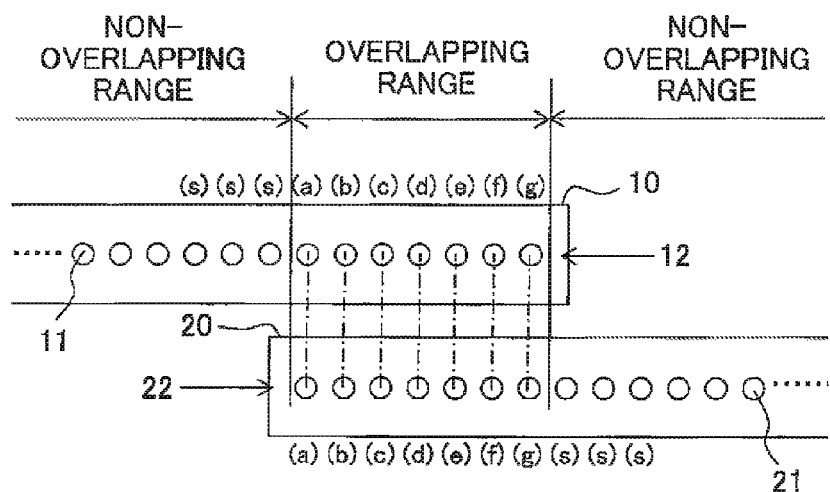
FIGS. 3A and 3B show diagrams explaining an ink-jetting control in an overlapping range of two head units.
Figure 3B:
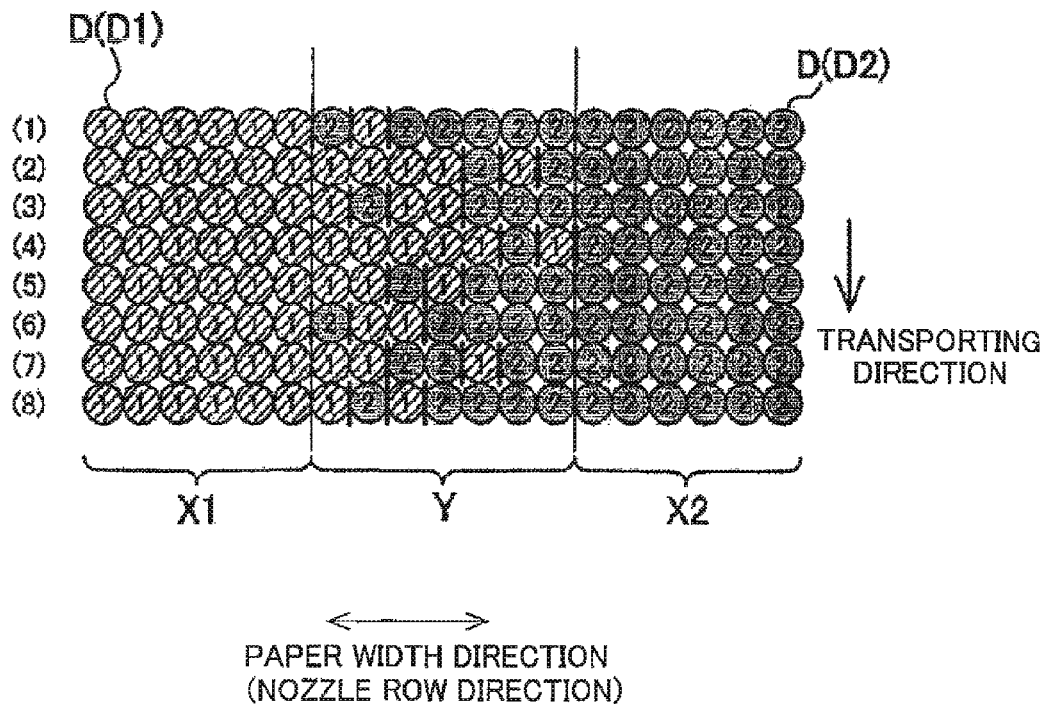

Next, a control of jetting inks by the two head units namely the first head unit 10 and the second head unit 20 is explained below. Such control is carried out by the control unit 6 at the time of recording an image on the recording paper 100 by the ink-jet head 2, when the data of the image to be recorded is input from the PC 35. In FIG. 3A, the two nozzle rows namely the first nozzle row 12 and the second nozzle row 22 which overlap partially are shown, and in FIG. 3B, a plurality of dots formed on the recording paper 100 by the first nozzle row 12 and the second nozzle row 22 is shown. In FIG. 3B, eight dot-rows are shown. For convenience of description, row numbers are assigned in order from an upstream side of the transporting direction to each of the eight dot-rows.

As shown in FIGS. 3A and 3B, the first head unit 10 and the second head unit 20 have the first nozzle row 12 and the second nozzle row 22 respectively, extended in the width direction of the recording paper 100. The right-end portion of the first nozzle row 12 and the left-end portion of the second nozzle row 22 overlap in the paper width direction. Seven first nozzles 11 and seven second nozzles 21 of the first nozzle row 12 and the second nozzle row 22 respectively are arranged in the overlapping range of the first nozzle row 12 and the second nozzle row 22. Moreover, the seven first nozzles 11 of the first nozzle row 12 are arranged at the same positions as the seven second nozzles 21 of the second nozzle row 22 in the nozzle-row direction, respectively. Moreover, a non-overlapping range which includes only first nozzles 11 and a non-overlapping range which includes only the second nozzles 21 are positioned on both right side and left side of the overlapping range.

The control unit 6 forms an image made of a plurality of dots arranged in the transporting direction, on the recording paper 100 by making the plurality of first nozzles 11 and the plurality of second nozzles 21 of the first head unit 10 and the second head unit 20 respectively jet inks onto the recording paper 100 transported in the transporting direction. In FIGS. 3A and 3B, an example of forming a so-called solid image in which a plurality of dots are arranged in row at an equal interval in the nozzle-row direction and the transporting direction is shown. However, according to the data of the image to be recorded which is sent from the PC 35 practically, as a matter of course, there may be a case in which some of the plurality of dots shown in FIG. 3B are not framed, or a case in which the dots are not formed in units of rows.

The control unit 6 makes form a plurality of dots D1 in an area X1 of the recording paper 100 by making jet inks from the plurality of first nozzles 11 in the non-overlapping range on the left side. Similarly, the control unit 6 makes form a plurality of dots D2 in an area X2 of the recording paper 100 by making jet inks from the plurality of second nozzles 21 in the non-overlapping range on the right side.

In the overlapping range in which the first nozzle row 12 and the second nozzle row 22 overlap, there exist the first nozzle 21 and the second nozzle 21 of which the positions in the nozzle-row direction coincide. The control unit 6 uses appropriately the first nozzle 11 and the second nozzle 21 in this overlapping range. In other words, seven dots D arranged in the paper width direction are formed in an area Y between the area X1 and the area X2 of the recording paper 100, and the control unit switches the nozzles which forms the seven dots D, between the first nozzle 11 and the second nozzle 21.

In FIG. 3A, for convenience of description, symbols (a), (b), (c) . . . , (g) are assigned in order from left to the seven nozzles in the overlapping range in the plurality of first nozzles 11 and the plurality of second nozzles 21 which form the first nozzle row 12 and the second nozzle row 22 respectively. Moreover, in the following description, symbols a, b, c, . . . , and g are assigned appropriately to the first nozzles 11 and the second nozzles 21 corresponding to the symbols (a), (b), (c), . . . , and (g). The first nozzle 11 and the second nozzles 21 for which the same symbol has been assigned, have their positions in the nozzle-row direction coincided. In other words, as for the first nozzle 11 and the second nozzle 21, pixels of same coordinates are assigned to the first nozzle 11 and the second nozzle 21 to which the same symbol have been assigned. At the time of forming each dot-row, the ink from any one of the first nozzle 11 and the second nozzle 21 is jetted. The first nozzle 11 and the second nozzle 21 positioned fourth from the left side in the overlapping range are to be described as a 'first nozzle 11$d$' and a 'second nozzle 21$d$', for example. Moreover, the first nozzle 11 and the second nozzle 21 in the non-overlapping range are to be described as a 'first nozzle 11$s$' and a 'second nozzle 21$s$', in order to distinguish the nozzles in the overlapping range from other nozzles.

Figure 4A:
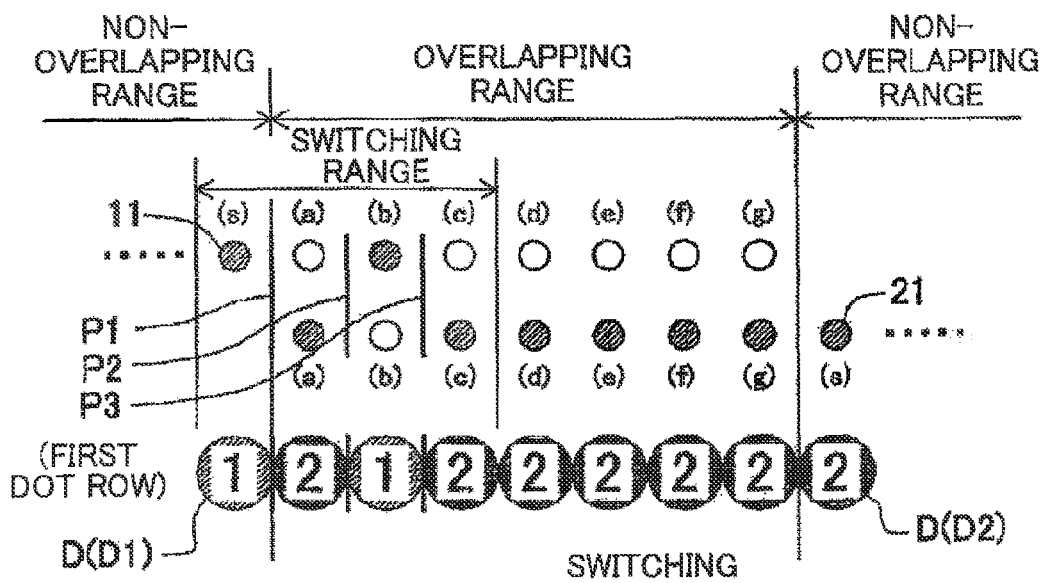
FIGS. 4A, 4B and 4C are diagrams showing a relationship between two nozzle rows and a dot-row formed by the two nozzle rows in FIG. 3A.
Figure 4B:
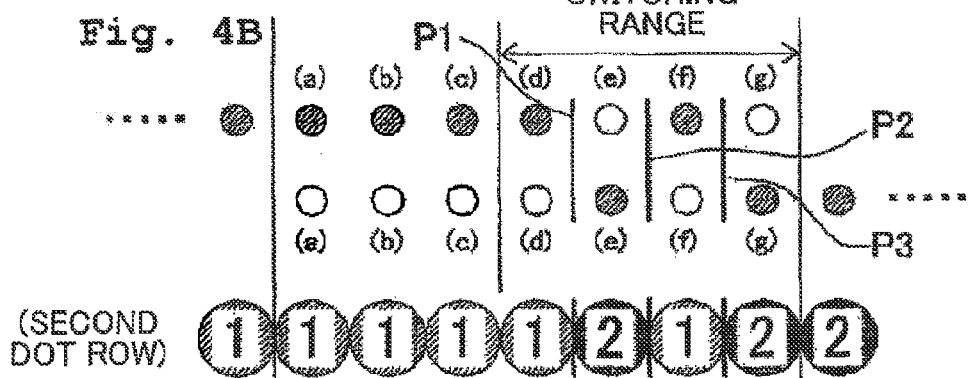
Figure 4C:
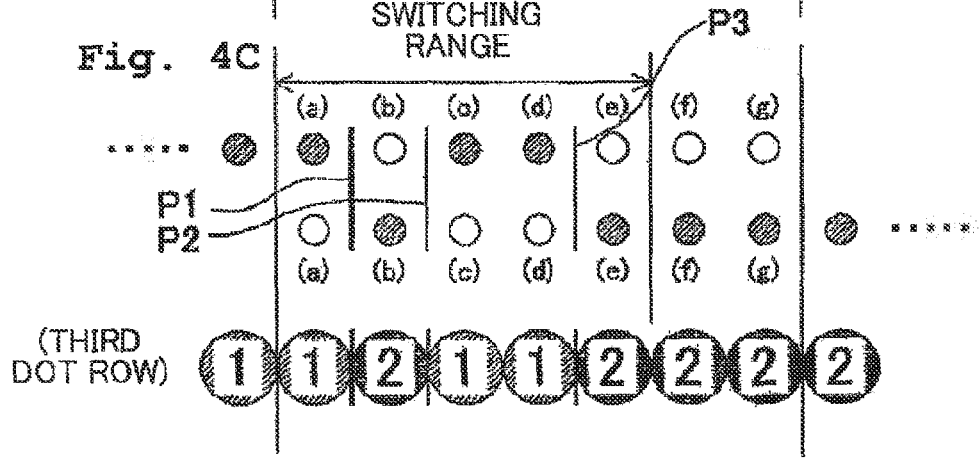

Switching of the first nozzle 11 and the second nozzle 21 in the overlapping range will be described below in detail. FIG. 4 is a diagram showing a relationship between two nozzle rows and a dot-row formed by the two nozzle rows in FIG. 3. In FIGS. 4A to 4C, a first dot-row, a second dot-row, and a third dot-row of the eight dot-rows in FIG. 8 are shown. Moreover, in FIGS. 4A to 4C, the nozzles jetting ink are hatched to clarify that the ink is to be jetted at the time of forming each dot-row from the hatched nozzles.

Switching of the first nozzle 11 and the second nozzle 21 at the time of forming each of the plurality of dot-rows will be described below by referring to FIGS. 4A to 4C. In the following description, switching of the first nozzle 11 and second nozzle 21 in the overlapping range is carried out for each row. In other words, the manner of switching of the first nozzle 11 and the second nozzle 21 differs between the two adjacent dot-rows.

Firstly, a switching range which is a range of switching of the first nozzle 11 and the second nozzle 21 is set for each dot-row. The switching range is defined as a range in which switching positions described below exist. In the present embodiment, three switching positions P1, P2, and P3 are set. As shown by thick lines in FIGS. 4A to 4C, the switching positions P1, P2, and P3 are set to any positions between the plurality of nozzles which is adjacent in the nozzle-row direction. Regarding the switching positions P1, P2, and P3, the ink is jetted from the first nozzle 11 on one side in the nozzle-row direction, and the ink is jetted from the second nozzle 21 on the other side in the nozzle-row direction. Even for the dot-rows shown in FIGS. 3 and 4, thick lines are drawn between a dot D1 formed by the first nozzle 11 and a dot D2 formed by the second nozzle 21 in order to make the correspondence with the three switching points P1, P2, and P3 easily understandable.

The switching range shown in FIGS. 4A to 4C can be defined as follows. The switching range is a range from the first nozzle 11 positioned at a further left side of the switching position P1 which is positioned at the extreme left side, up to the second nozzle 21 positioned at a further right side of the switching position P3 which is positioned at the extreme right side.

Moreover, the switching range can also be defined by another expression as follows. A nozzle positioned at an end of a left side (side of the first head unit 10) of the switching range is the first nozzle 11 positioned at the further left side of the second nozzle 21 positioned at the extreme left side out of the second nozzles 21 which form the dot D2 by jetting the ink. In an example of the first dot-row in FIG. 4A, a nozzle positioned at the extreme left out of the second nozzles 21 which jet the ink is a second nozzle 21$a$. The first nozzle 11$s$ in the non-overlapping range which is positioned at further left side of the second nozzle 21 corresponds to a nozzle at a left end of the switching range. Moreover, in an example of the second dot-row, the first nozzle 11$d$, and in an example of the third dot-row, the first nozzle 11$a$ corresponds to the nozzle at the left end of the switching range, respectively.

Moreover, a nozzle positioned at an end on a right side (side of the second head unit 20) of the switching range is a second nozzle 21 positioned at the further right side of the first nozzle 11 positioned at the extreme right side out of the first nozzles 11 which form the dot D1 by jetting the ink. In an example of the first dot-row in FIG. 4A, a nozzle positioned at the extreme right out of the first nozzles 11 which jet the ink, is a first nozzle 11$b$. A second nozzle 21$c$ positioned at a further right side of the first nozzle 11$b$ corresponds to a nozzle at a right end of the switching range. Moreover, in an example of the second dot-row, a second nozzle 21$g$, and in an example of the third dot-row, a second nozzle 21$e$ corresponds to the nozzle at the right end of the switching range, respectively.

Moreover, the switching range is a range narrower than the overlapping range. This can be put in other words as, the number of dots D formed on the recording paper 100 by the nozzles in the switching range is smaller than the number of dots D formed by the nozzles in the overlapping range. In the present embodiment, the number of nozzles in the overlapping range is seven whereas, the number of nozzles in the switching range at the time of forming the first dot-row is four, the number of nozzles in the switching range in the second dot-row is four, and the number of nozzles in the switching range in the third dot-row is five.

Furthermore, the switching ranges differ for the two dot-rows which are adjacent in the transporting direction. The switching ranges differ, means that either widths of the switching ranges or positions of the switching ranges differ. For instance, the switching range at the time of forming the first dot-row is a range from the first nozzle 11s in the non-overlapping range up to the second nozzle 21c in the overlapping range. Whereas, for the second dot-row, the switching range is from the first nozzle 11d up to the second nozzle 21g. Moreover, for the third dot-row, the switching range is from the first nozzle 11a up to the second nozzle 21e.

The characteristics of switching of the first nozzle ii and the second nozzle 21 in the nozzle-row direction in the present embodiment are listed below;
(a) At the time of forming each dot-row, there are three switching positions in the switching range.
(b) The switching range is smaller than the overlapping range.
(c) The switching positions differ for the two adjacent dot-rows.

Significance of the characteristics (a), (b), and (c) will be described below by comparing the present embodiment which satisfies the requirements (a) to (c), and the comparative embodiments 1 and 2 which do not satisfy the requirements (a) to (c).

Figure 5A:
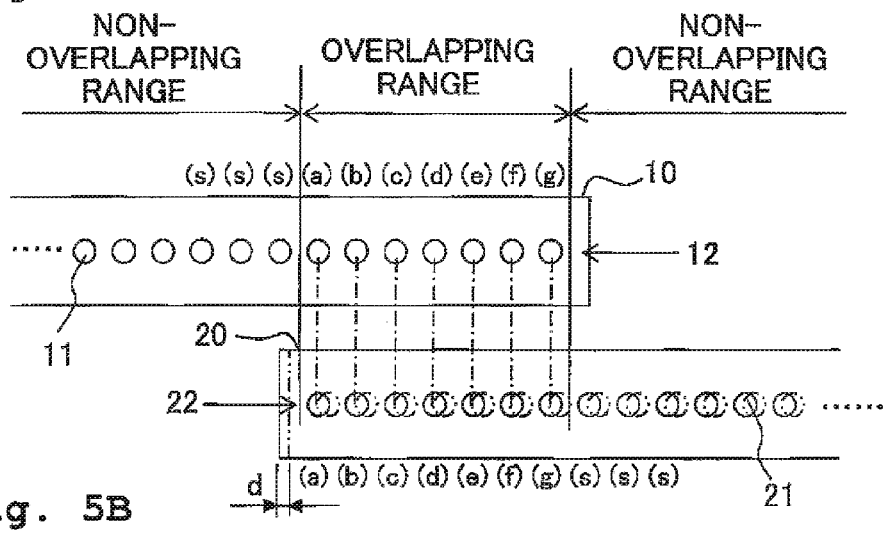
FIGS. 5A, 5B and 5C are diagrams showing a plurality of dot-rows formed in an embodiment.
Figure 5B:
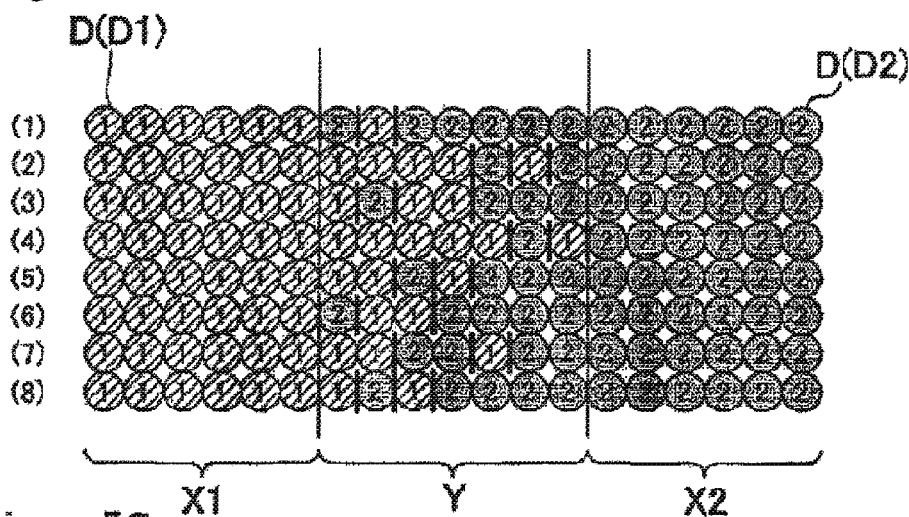
Figure 5C:
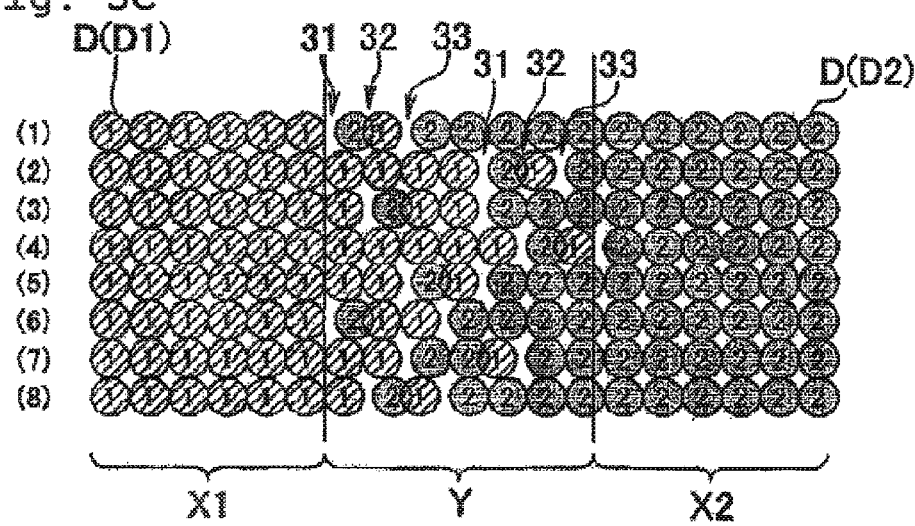
Figure 6A:
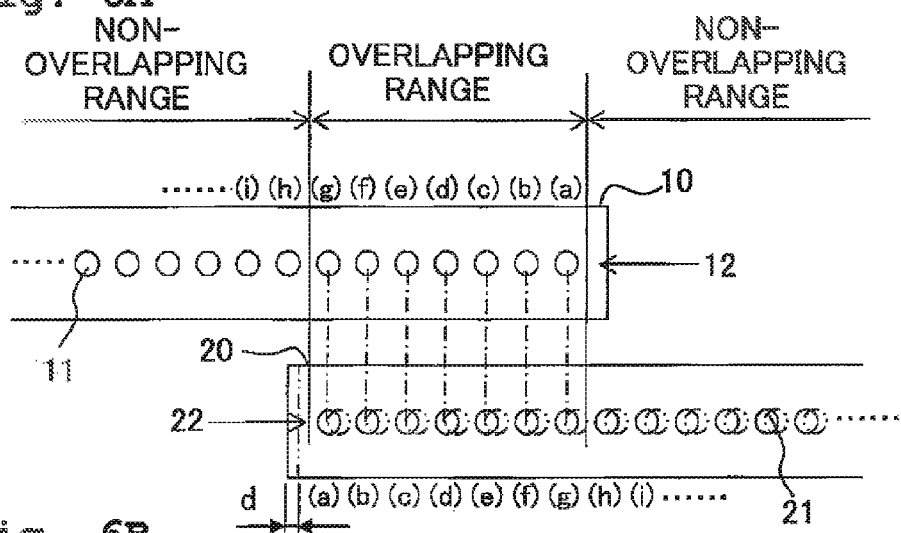
FIGS. 6A, 6B and 6C are diagrams showing a plurality of dot-rows formed in a comparable embodiment 1.
Figure 6B:
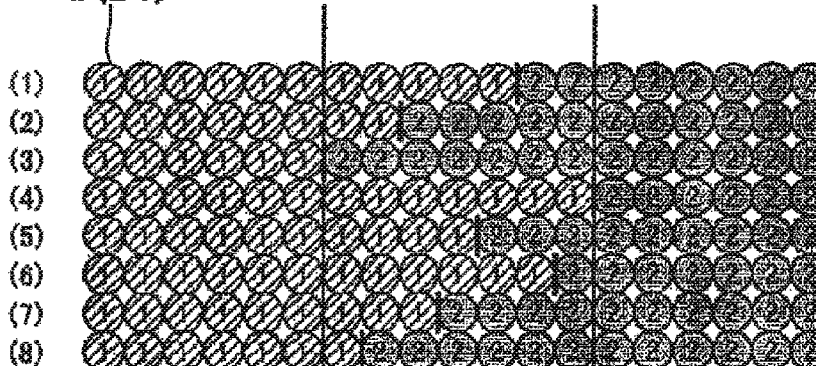
Figure 7A:
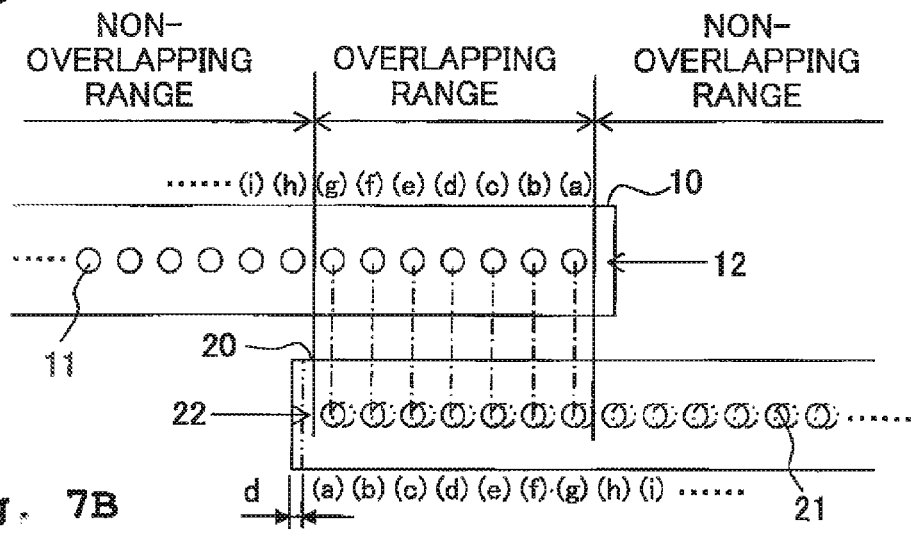
FIGS. 7A, 7B and 7C are diagrams showing a plurality of dot-rows formed in a comparable embodiment 2.
Figure 7B:
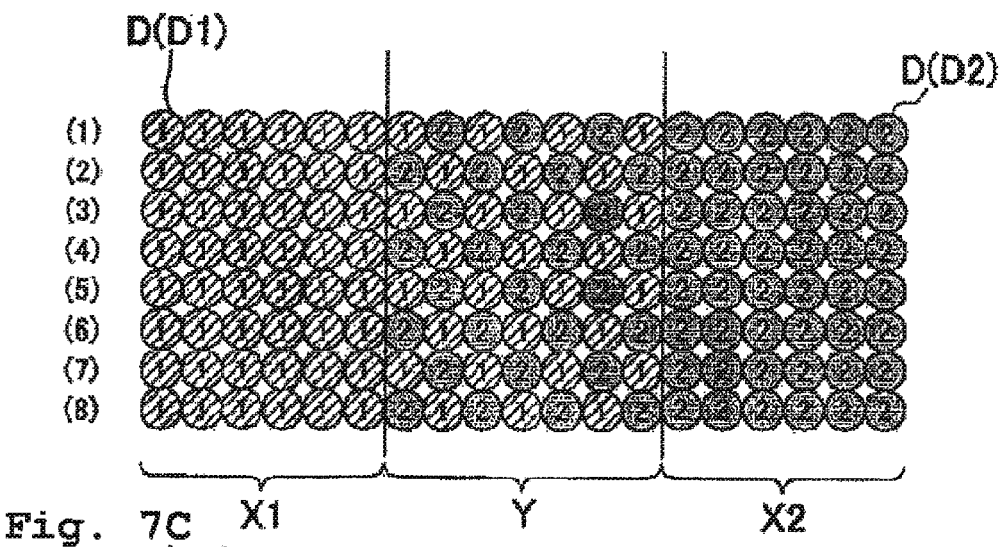
Figure 7C:
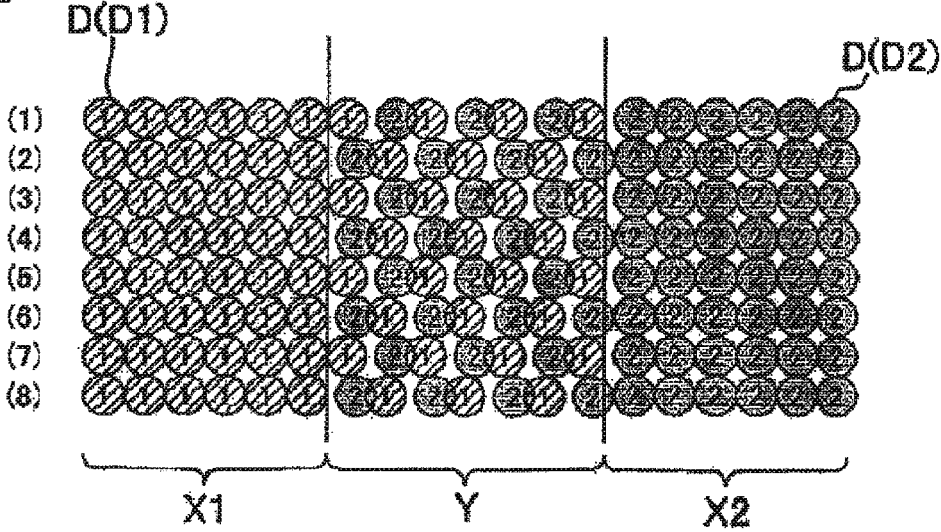

FIG. 5A, FIG. 6A, and FIG. 7A, show dot-rows in a ease in which there is no misalignment of positions between the first head unit 10 and the second head unit 20. FIG. 5B, FIG. 6B, and FIG. 7B show dot-rows in a ease in which there is a misalignment of positions between the first head unit 10 and the second head unit 20.

For the characteristic (a), the present embodiment will be compared with the comparative embodiment 1. As shown in FIG. 6A, in the comparative embodiment 1, in a case of forming any of the dot-rows, there is only one switching position of the first nozzle 11 and the second nozzle 21. In the comparative embodiment 1, a case in which the position of the second head unit 20 with respect to the ideal position shown by a solid line is shifted toward right is to be taken into consideration. In other words, a case in which the position of the second head unit 20 is shifted relatively only by a distance d in a direction away from the first head unit 10 as shown by alternate long and two short dashed lines. At this time, as shown in FIG. 6B, since the two dots D1 and D2 which are formed by the first nozzle 11 and the second nozzle 21 having the switching positions narrowed, move farther away, a density of a portion 30 corresponding to the switching position becomes low for all the dot-rows. Conversely, in a case in which the position of the second head unit 20 is misaligned relatively in a direction away from the first head unit 10, the density of the portion 30 corresponding to the switching position becomes high for all the dot-rows. In such manner, since only a portion having a low density or a portion having a high density appears locally in a portion of an area Y of an image formed on the recording paper 100, the portion is significantly conspicuous.

Whereas, as shown in FIG. 5A, in the present embodiment, there are three switching positions of the first nozzle 11 and the second nozzle 21 at the time of forming each dot-row. In other words, the characteristic (a) is fulfilled. Here, a case in which the position of the second head unit 20 is relatively misaligned only by distance d toward right with respect to the first head unit 10, as shown by alternate long and two short dashed lines, is to be taken into consideration. In this case, as shown in FIG. 5B, a portion corresponding to some switching positions of each dot-row becomes a portion with a high density, and a portion corresponding to the remaining switching positions becomes a portion with a low density. More concretely, in a portion with the first nozzle 11 on the left side and a portion with the second nozzle 21 on the right side sandwiching the switching position, or in other words, in portions 31 and 33 corresponding to the switching positions P1 and P3 in FIG. 4, since the two dots D1 and D2 are separated apart, the density becomes low. Whereas, in a portion with the first nozzle 11 on the right side and a portion with the second nozzle 21 on the left side sandwiching the switching position, or in other words, in a portion 32 corresponding to the switching position P2 in FIG. 4, since the two dots D1 and D2 come closer and overlap partially, the density becomes high.

Moreover, in a case in which the position of the second head unit 20 has misaligned relatively toward left with respect to the first head unit 10, the situation is opposite to the above-mentioned situation. In other words, in the portions 31 and 33 corresponding to the switching positions P1 and P3 in FIG. 4, since the two dots D1 and D2 come closer and overlap partially, the density becomes high, and in the portion 32 corresponding to the switching position P2 in FIG. 2, since the two dots D1 and D2 are separated apart, the density becomes low. In such manner, when the position of the first head unit 10 and the position of the second head unit 20 are misaligned in the nozzle-row direction, in the present embodiment, the dark portions and the light portions are mixed in the area Y. Therefore, a single dark portion or a single light portion is not susceptible to be conspicuous.

Regarding the characteristics (b) and (c), the present embodiment will be compared with the comparative embodiment 2. As shown in FIG. 7A, in the comparative embodiment 1, the first nozzle 11 and the second nozzle 21 are switched in the overall overlapping range for any of the dot-rows. In other words, the plurality of switching positions exists to be scattered in the overall overlapping range. Moreover, the switching range in the present embodiment can be said to be wider than the overlapping range.

In such manner, in a ease in which the plurality of switching positions exists in the overall overlapping range, when the relative positions of the first head unit 10 and the second head unit 20 are misaligned in the nozzle-row direction, the dark area and the light area are mixed in the overall area Y corresponding to the overlapping range, of each dot-row. Accordingly, the density is uniformized in the overall image portion of the area Y of the image recorded on the recording paper 100. However, conversely, the overall image portion of the area Y becomes conspicuous in the form of a band having a different density with respect to the areas X1 and X2 corresponding to the non-overlapping range, on the two sides thereof.

Whereas, the present embodiment fulfils the characteristic (b), that is, the switching range is smaller than the overlapping range. Consequently, when the relative positions of the first head unit 10 and the second head unit 20 are misaligned in the nozzle-row direction, a range in which the dark portions and the light portions are mixed becomes narrow. Moreover, the present embodiment fulfils the characteristic (c) that is, the switching positions differ for the two adjacent dot-rows. In other words, the range in which the dark portions and the light portions are mixed is misaligned between the adjacent dot-rows. Accordingly, a width of the portion of the recording image in which the dark portions and the light portions are mixed becomes narrower than the overlapping range, and also, an outline thereof assumes an irregular shape. Consequently, the portion in which the dark portions and the light portions are mixed does not assume the band shape, and is not susceptible to be conspicuous with respect to image portions on a left side and a right side.

Moreover, in the present embodiment, for all the dot-rows, the switching range is set such that all the characteristics (a), (b), and (c) are fulfilled. Therefore, the portion with the high density (dark portion) locally or the portion with the low density (light portion) locally in the image portion of the area Y corresponding to the overlapping range is further not susceptible to be conspicuous.

Figure 8A:
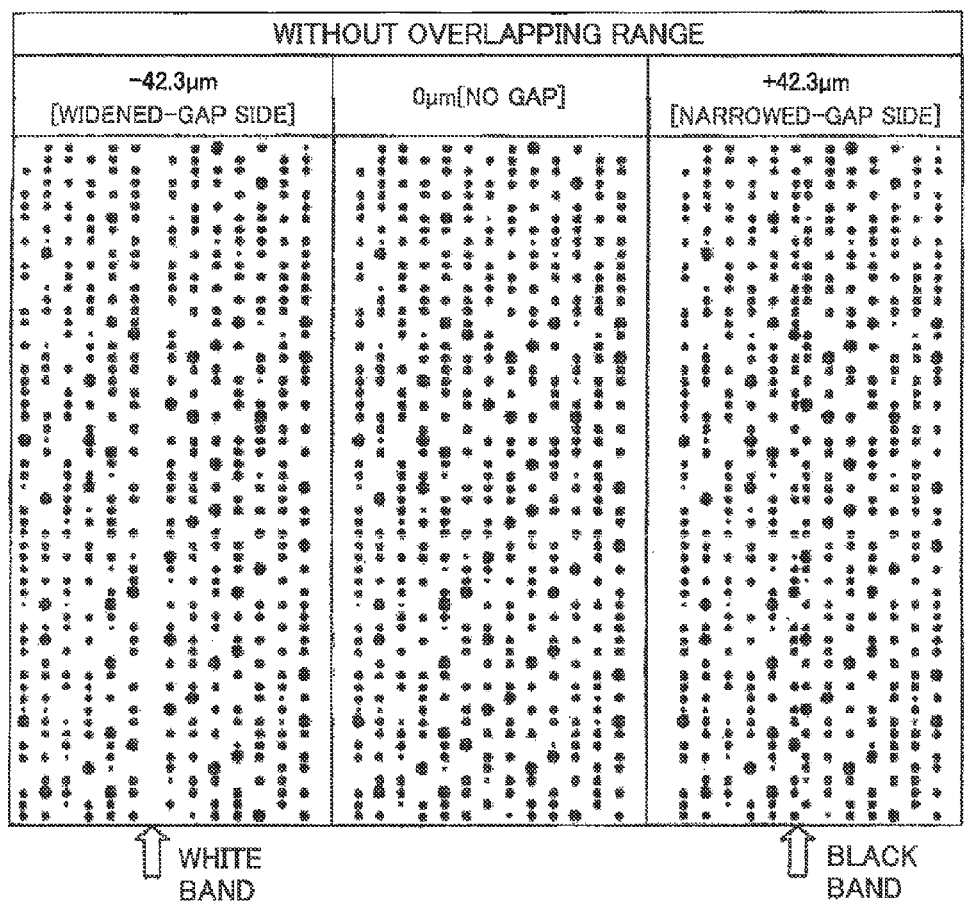
FIG. 8A and FIG. 8B are diagrams showing schematically, patterns formed by a plurality of dot-rows, recorded on a recording paper.
Figure 8B:
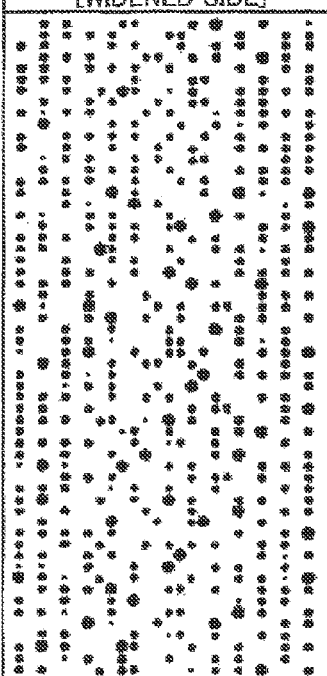

FIG. 8A and FIG. 8B are diagrams showing schematically, patterns formed by a plurality of dot-rows, recorded on a recording paper. FIG. 8A shows patterns formed by an ink-jet head in which nozzle rows of two head units are not overlapping, or in other words, an ink-jet head without the overlapping range. Whereas, FIG. 8B shows patterns formed by an ink-jet head of the present embodiment.

In FIG. 8A and FIG. 8B, a lateral direction is a paper width direction (nozzle-row direction), and a longitudinal direction is the transporting direction. Resolution in the lateral direction is 300 dpi (dots per inch), and resolution in the longitudinal direction is 600 dpi. Moreover, in FIG. 8A and FIG. 8B, an amount of ink droplets jetted from one nozzle is changed to three types, and accordingly, a pattern made of three types of dots having different sizes namely, large, medium, and small is formed on the recording paper 100. Each of '−42.3 µm', '0 µm', and '+42.3 µm' indicates an amount of shift in position in the nozzle-row direction of the first head unit 10 and the second head unit 20. In other words, a pattern on a left side shows a state in which the relative positions of the first head unit 10 and the second head unit 20 are shifted by 42.3 µm in a direction of separating apart mutually. Moreover, a pattern at a center shows a state in which there is no position misalignment of the first head unit 10 and the second head unit 20. Moreover, a pattern on a right side shows a state in which the relative positions of the first head unit 10 and the second head unit 20 are shifted by 42.3 µm in a direction of coming closer.

As shown in FIG. 8A, in the ink-jet head without the overlapping range, when the relative positions of the first head unit 10 and the second head unit 20 are shifted in a direction of separating apart, white lines appear in the pattern. Moreover, when the relative positions of the first head unit 10 and the second head unit 20 are shifted in the direction of coming closer, black lines appear in the pattern. However, as shown in FIG. 8B, in the ink-jet head according to the present embodiment, even when the relative positions of the two head units are shifted, it is revealed that the white lines or the black lines are not susceptible to be visible.

Next, modified embodiments of the present embodiment will be described below. Same reference numerals are assigned to components which have a similar structure as in the embodiment, and repeated description of such components is omitted.

First Modified Embodiment

In the embodiment shown in FIG. 3 and FIG. 4, for all the dot-rows, there have been three switching positions of the switching range. However, the present teaching is not restricted to such an arrangement. For instance, for some of the dot-rows, there are three switching positions of the switching range, and for the remaining dot-rows, there may be one switching position. In an example shown in FIG. 9 and FIG. 10, at the time of forming even-numbered dot-rows, or in other words, a second dot-row, a fourth dot-row, a sixth dot-row, and an eighth dot-row, there are three switching positions of the switching range. Whereas, at the time of forming odd-numbered dot-rows, or in other words, a first dot-row, a third dot-row, a fifth dot-row, and a seventh dot-row, there is only one switching position of the switching range. For making the density change due to the switching of nozzle to be inconspicuous, it is preferable that for a large number of nozzle rows, there are three switching positions. Concretely, it is preferable that for more than half of all the nozzle rows, there are three switching positions.

Second Modified Embodiment

Figure 11A:
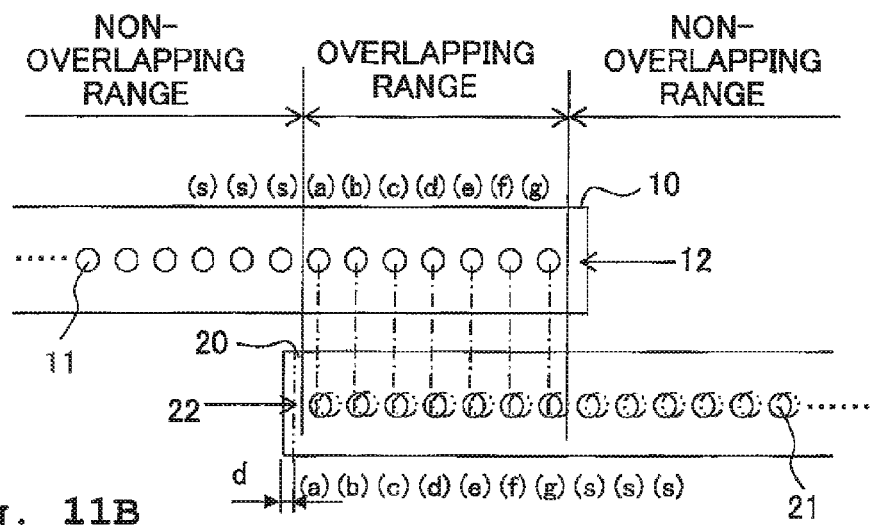
FIGS. 11A, 11B and 11C are diagrams showing a plurality of dot-rows formed in a second modified embodiment.
Figure 11B:
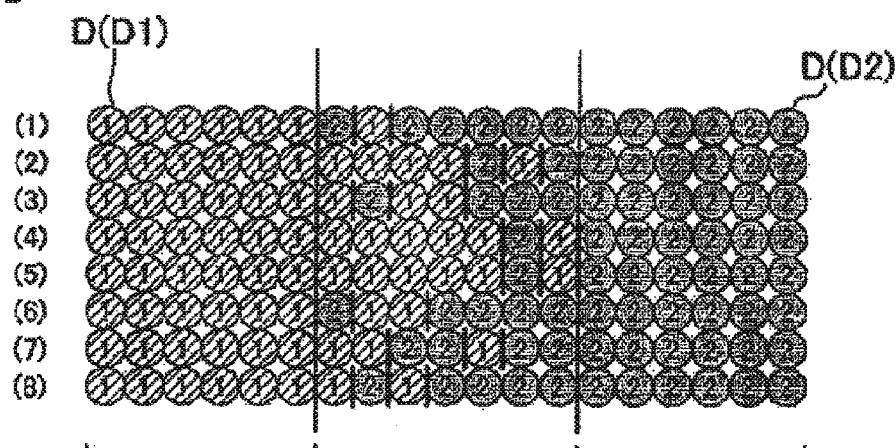
Figure 11C:
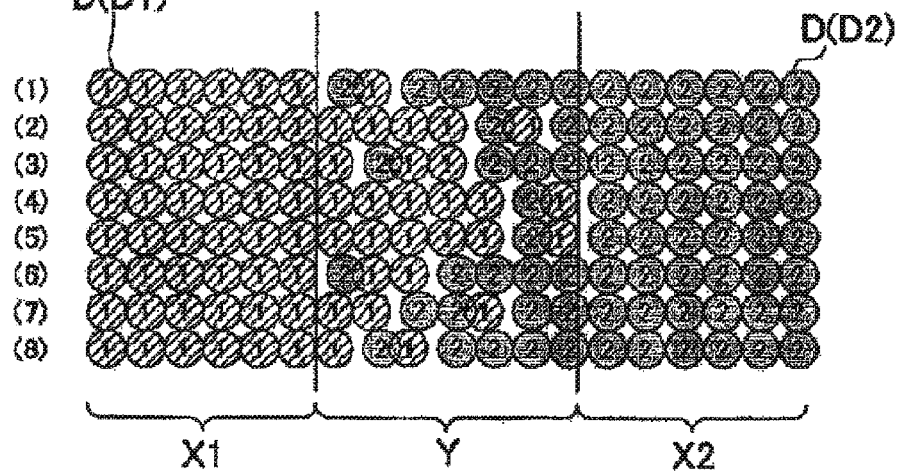

In the embodiment, for all the dot-rows, the switching range in which the first nozzle 11 and the second nozzle 21 are switched was made to differ for the adjacent dot-rows. However, the present teaching is not restricted to such an arrangement. For instance, for some of the dot-rows, the switching range may coincide with the dot-rows adjacent to these dot-rows. For instance, in an example in FIG. 11, the switching range coincides for the fourth dot-row and the fifth dot-row.

Third Modified Embodiment

Figure 12A:
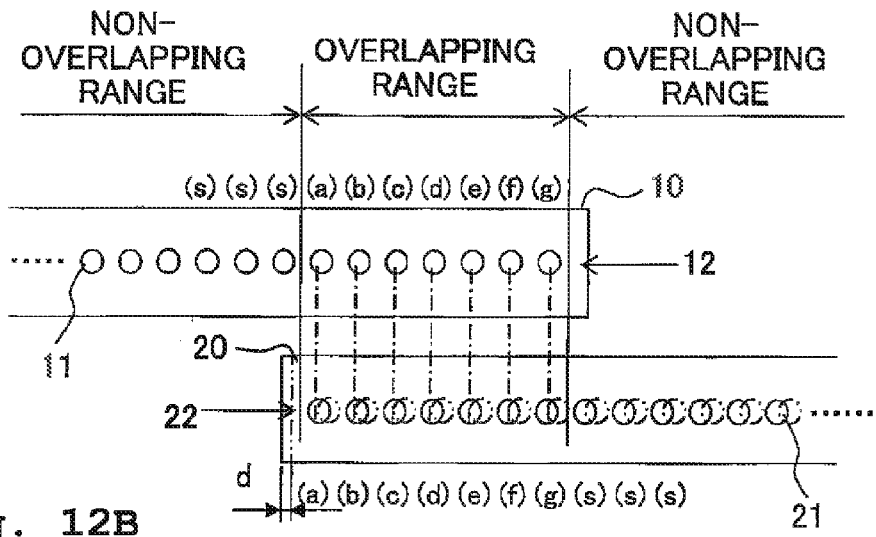
FIGS. 12A, 12B and 12C are diagrams showing a plurality of dot-rows formed in a third modified embodiment.
Figure 12B:
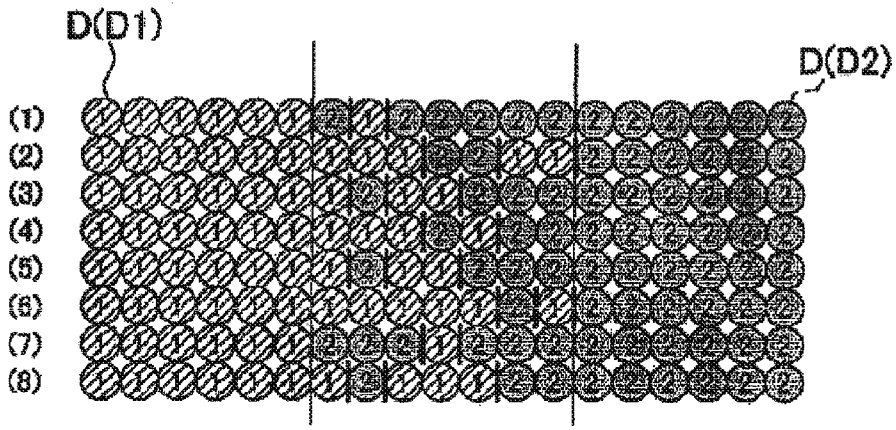
Figure 12C:
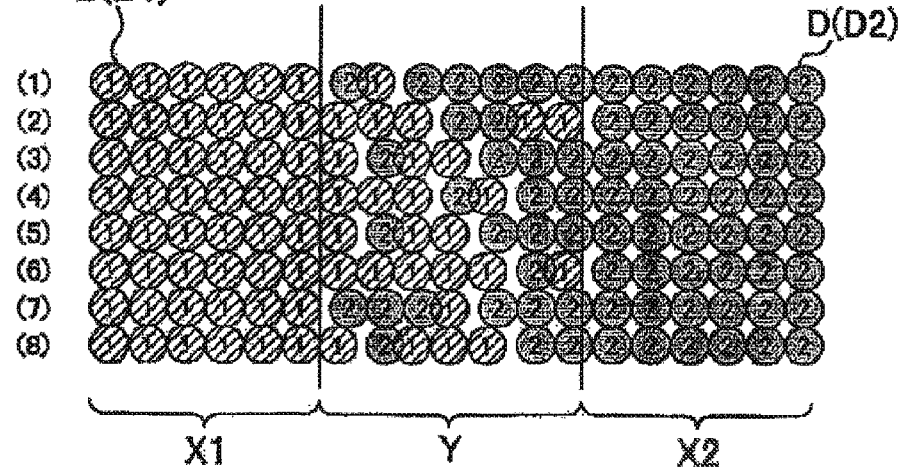

In the embodiment, while the switching range differs in the adjacent dot-rows, some of the three switching positions in the switching range coincides with each other. For instance, in FIG. 4, the switching position P1 at the left end in the switching range at the time of forming the second dot-row coincides with the switching position P3 at the right end in the switching range at the time of forming the third dot-row. However, the present teaching is not restricted to such an arrangement. For instance, as shown in FIG. 12, for all the dot-rows, all the switching positions may be different for the adjacent dot-rows. The switching positions differ for the two adjacent dot-rows means that the switching range does not overlap for the two dot-rows. In such manner, by letting all the switching positions to be different for the adjacent dot-rows for all the dot-rows, the portion with the high density (dark portion) locally or the portion with the low density (light portion) is further not susceptible to be conspicuous.

Fourth Modified Embodiment

In the embodiment, three switching positions have been set in the switching range. However, the present teaching is not restricted to such an arrangement. For instance, there may be five or more than five switching positions. The non-overlapping range of only the first nozzle 11 is positioned on the left side of the overlapping range and the non-overlapping range of only the second nozzle 21 is positioned on the right side of the overlapping range. Therefore, the switching frequency of the first nozzle 11 and the second nozzle 21 in the overlapping range becomes odd number of times inevitably. In other words, the number of switching positions becomes odd all the time, and it is unlikely that the number of switching positions becomes even.

Fifth Modified Embodiment

Figure 13A:
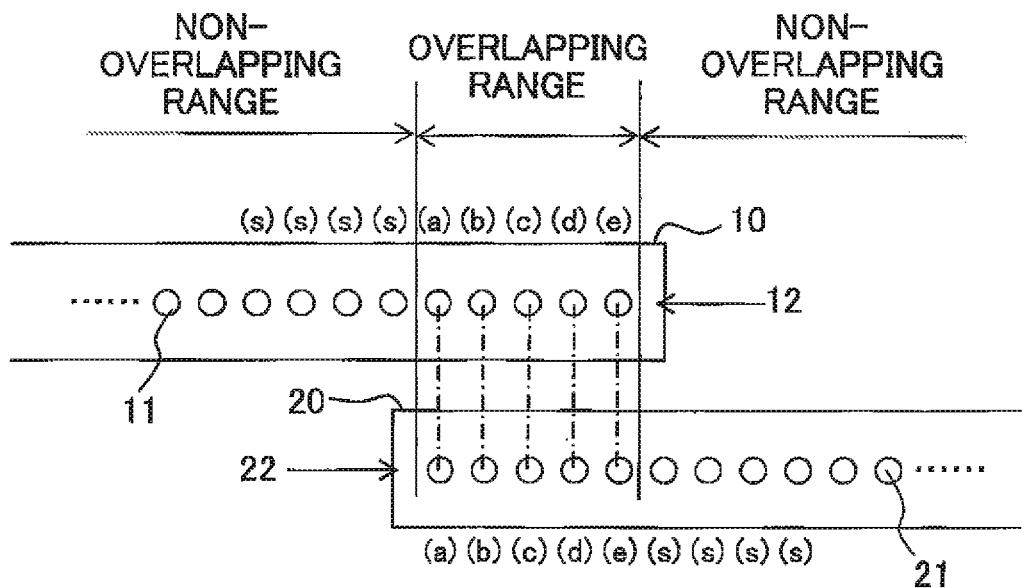
FIGS. 13A and 13B are diagrams showing a plurality of dot-rows formed in a fifth modified embodiment.
Figure 13B:
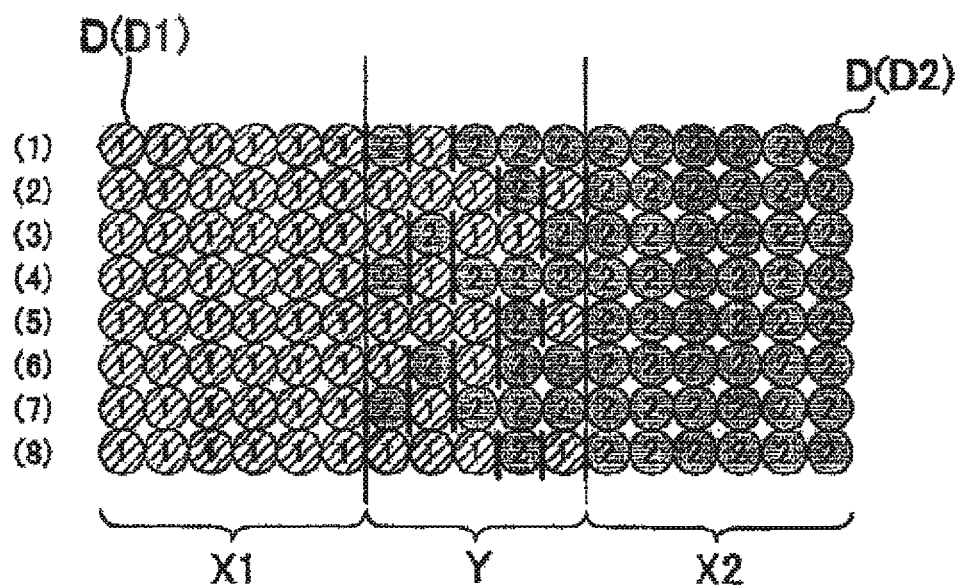
Figure 13B:
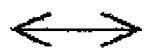

In the embodiment, the number of nozzles of the overlapping range is seven. However, the present teaching is not restricted to such an arrangement. For instance, it is possible to change appropriately the number of nozzles of the overlapping range. For example, in FIG. 13, the number of nozzles of the overlapping range is five, and the switching positions at the time of forming each dot are three. For letting the three switching positions exist in the switching range narrower than the overlapping range, it is necessary that at least four nozzles are arranged in the switching range. Accordingly, it is necessary to let the number of nozzles in the overlapping range to be five or more than five.

Sixth Modified Embodiment

The ink-jet head 2 in the embodiment was an ink-jet head of a line-type. However, it may be an ink-jet head of a so-called serial-type, which includes a plurality of nozzles arranged in row along the transporting direction, and which jets an ink toward a recording paper while moving in a scanning direction which is orthogonal to the transporting direction.

Seventh Modified Embodiment

The number of head units is not restricted to two, and three or more than three head unit may be arranged in a zigzag form along the nozzle-row direction.

Eighth Modified Embodiment

In the embodiment, two or more than two head units have been arranged such that some of the nozzles overlap mutually. However, the present teaching is not restricted to such an arrangement, and is also applicable to an ink-jet printer which includes a single head unit for example. In the following description, same reference numerals are used for components which are same as in the ink-jet printer 1, and description of such components will be omitted.

Figure 14:
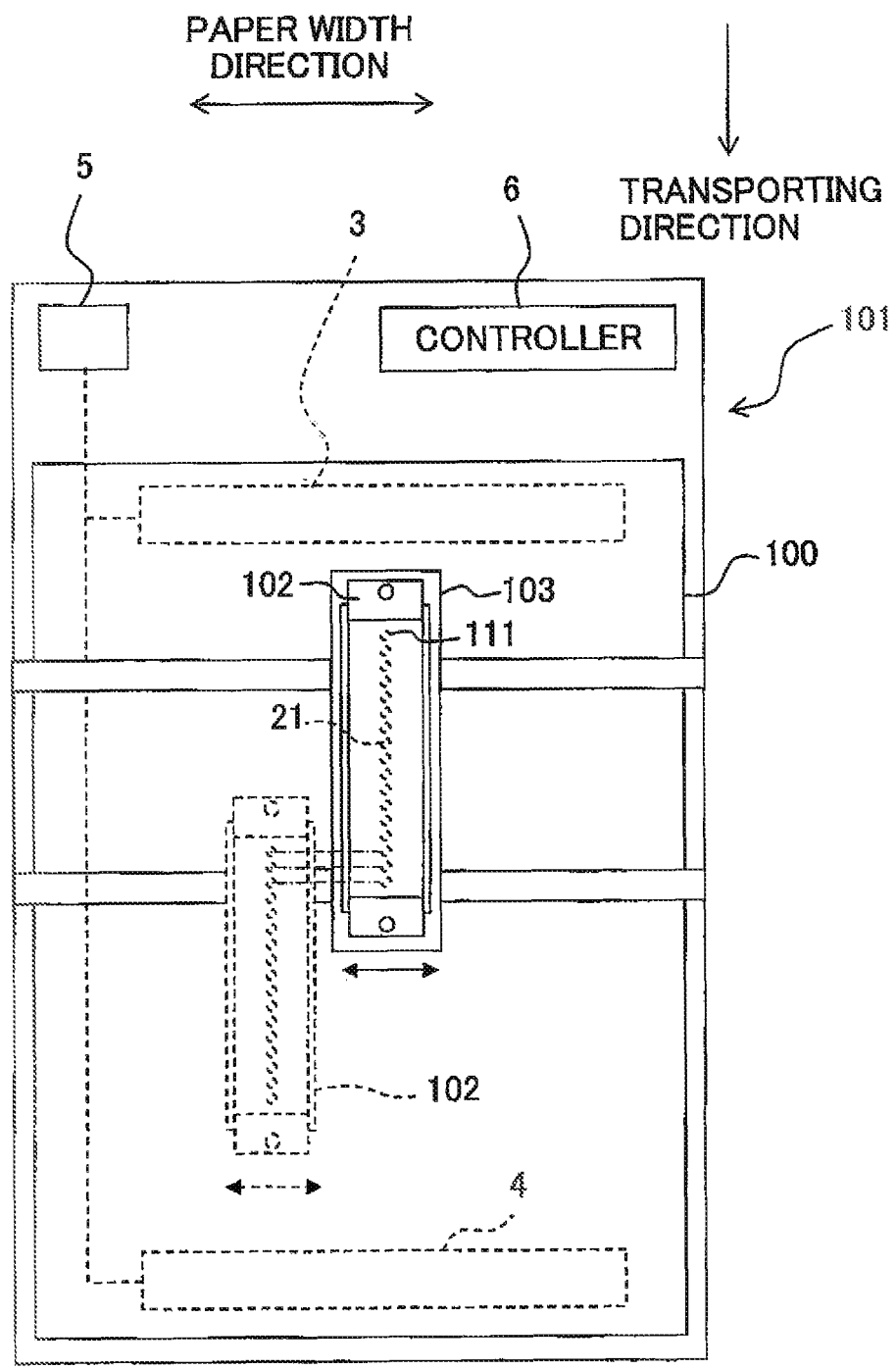
FIG. 14 is a diagram corresponding to FIG. 1 of an ink-jet printer of a serial type according to a seventh modified embodiment.
Figure 15A:
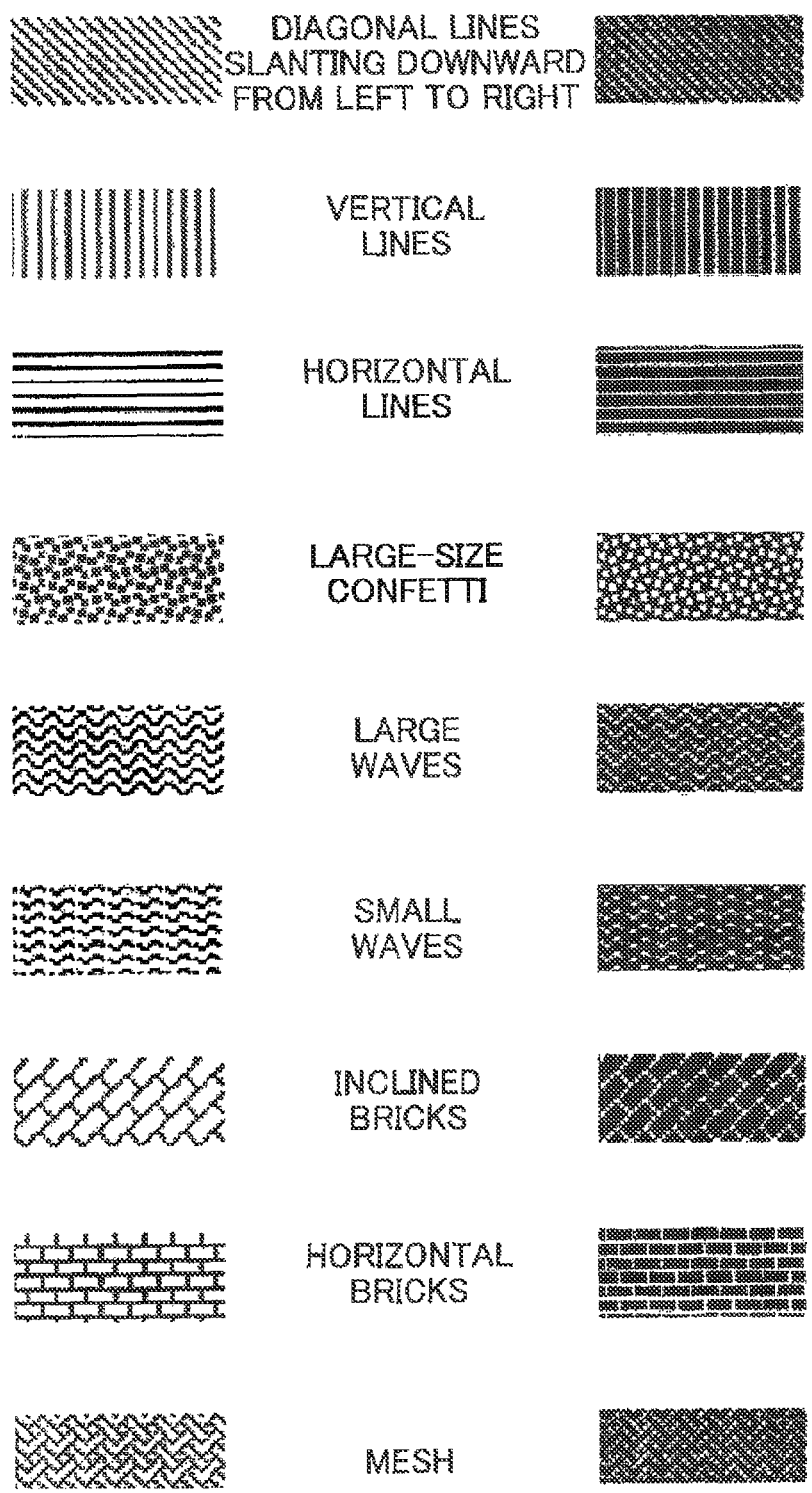
FIGS. 15A and 15B are diagrams showing a pattern used in an example example 2, and a comparable example.
Figure 15B:
Figure 15B:
Figure 15B:
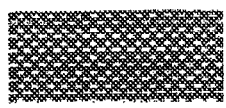
Figure 15B:
Figure 15B:
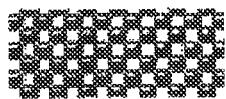
Figure 15B:
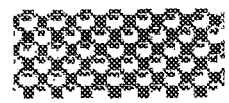
Figure 15B:
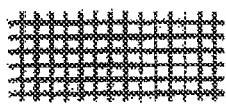
Figure 15B:
Figure 15B:
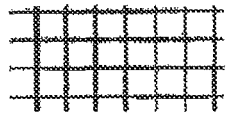
Figure 15B:
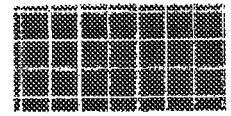
Figure 15B:
Figure 15B:
Figure 15B:
Figure 15B:
Figure 15B:
Figure 15B:
Figure 15B:
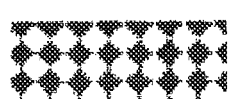
Figure 15B:

An ink-jet printer 101 of a serial type shown in FIG. 14 includes an ink-jet head 102 which jets an ink on to the transported recording paper 100 from a plurality of nozzles 111 arranged in rows in the transporting direction of the recording paper 100, a scanning mechanism which scans in a scanning direction that is orthogonal to the transporting direction while holding the ink-jet head 102, and two transporting rollers 3 and 4 and the transporting motor 5 which transport the recording paper 100 in the transporting direction. Accordingly, the ink-jet printer 101 records an image by forming a plurality of dot-rows extended in the scanning direction and arranged side-by-side in the transporting direction, on the recording paper 100. In this case, by a certain scanning (first scanning), the ink-jet head 102 jets the ink from the plurality of nozzles 111 while scanning in the scanning direction. Moreover, before the subsequent scanning (second scanning), the ink-jet printer 101 transports the recording paper 100 by a predetermined amount in the transporting direction. Thereafter, in the second scanning, once again, the ink-jet printer 101 jets the ink from the plurality of nozzles 111 while scanning by the ink-jet head 102 in the scanning direction. At this time, some of the nozzles 111 positioned at the most upstream side of the transporting direction in the first scanning, and some of the nozzles 111 positioned at the most downstream side of the transporting direction in the second scanning are controlled to make the ink land at the same positions in the transporting direction of the paper. In the eighth modified embodiment, seven nozzles 111 positioned at the most upstream side of the transporting direction in the first scanning and seven nozzles 111 positioned at the most downstream side of the transporting direction in the second scanning overlap mutually. Here, as aforementioned, between the first scanning and the second scanning, the recording paper 100 is transported by only the predetermined amount in the transporting direction. However, in FIG. 14, to show in an easily understandable manner, instead of transporting the recording paper 100 by the predetermined amount in the transporting direction, the ink-jet head 102 is shown to be misaligned by only the predetermined amount in the transporting direction. In FIG. 14, the ink-jet head 102 in the first scanning is shown by dotted lines, and the ink-jet head 102 in the second scanning is shown by solid lines. Here, in the first scanning and the second scanning, a range of nozzles which forms dots in a range same as of the recording paper 100 is defined as the overlapping range similarly as in the embodiment. In the eighth modified embodiment, concretely, the seven nozzles 111 positioned at the most upstream side of the transporting direction in the first scanning and the seven nozzles 111 positioned at the most downstream side of the transporting direction in the second scanning are nozzles in the overlapping range. These nozzles are switched similarly as in the embodiment.

EXAMPLES

Concrete examples of the present invention will be described by referring to a comparative example. Firstly, recording conditions of two examples (example 1 and example 2) and a comparative example will be described below.

[Recording Conditions]
(1) Common conditions (common in example 1, example 2, and comparative example)
(Ambient temperature) 25° C.
(Resolution) 300 dpi in the paper width direction, 600 dpi in the transporting direction
(Amount of ink droplets jetted from the nozzle) 5 pl, 14 pl, 35 pl
(Number of nozzles in overlapping range) seven
(Types of patterns to be recorded)
Total of 38 types of patterns including 36 types of patterns shown in FIGS. 16A to 16C, +vertical ruled line pattern+horizontal ruled line pattern, to be changed in three types of amount of liquid droplets, thereby forming 114 sorts of patterns For each of the 114 sorts of patterns, three sorts of patterns namely, no position shift (position shift 0 μm) of two head units, position shift (−40 μm) in direction of separating apart, position shift (+40 μm) in direction of coming closer, to be recorded. Total of 342 patterns are to be formed.
(2) Particular Conditions a) Example 1

The example 1 is an example corresponding to the embodiment in FIG. 3, FIG. 4, and FIG. 5A and FIG. 5B.

For all dot-rows, there are three switching positions in the switching range.

For all dot-rows, the switching range is narrower than the overlapping range.

For all dot-rows, the switching range differs for the adjacent dot-rows.

b) Example 2

Figure 9A:
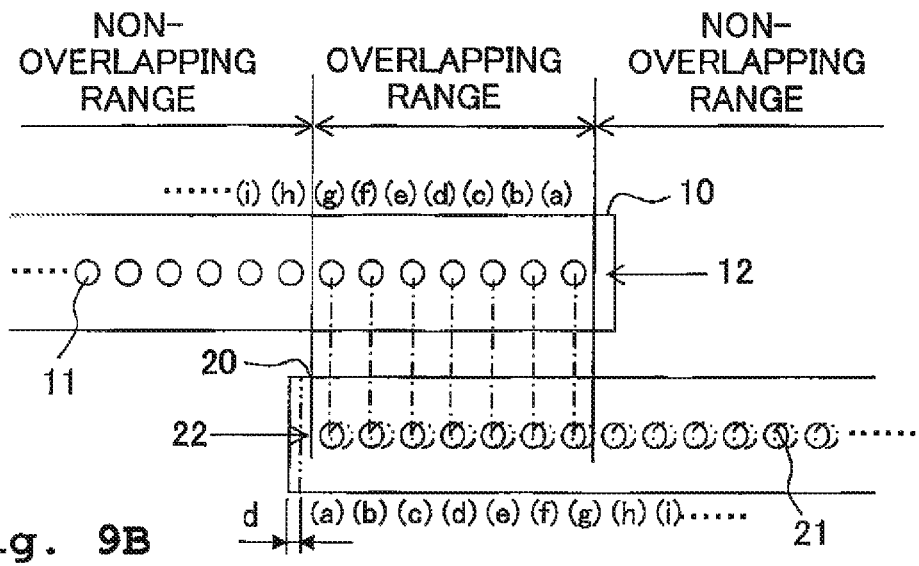
FIGS. 9A, 9B and 9C are diagrams showing a plurality of dot-rows formed in a first modified embodiment.
Figure 9B:
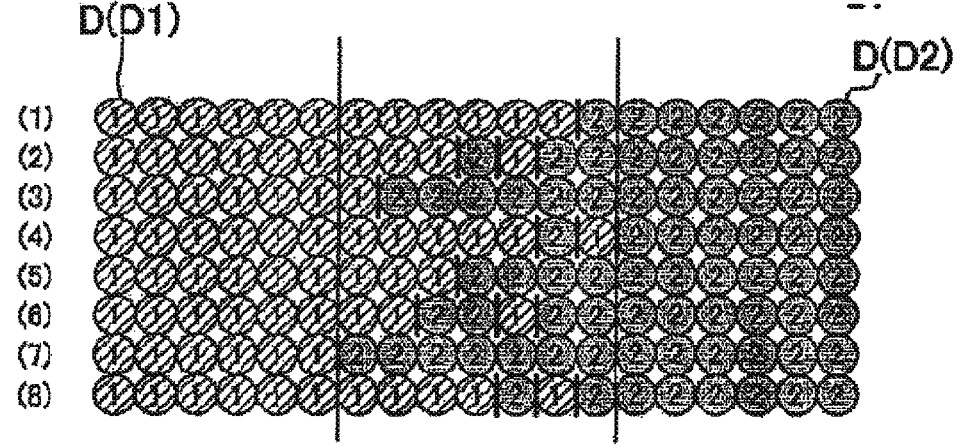
Figure 9C:
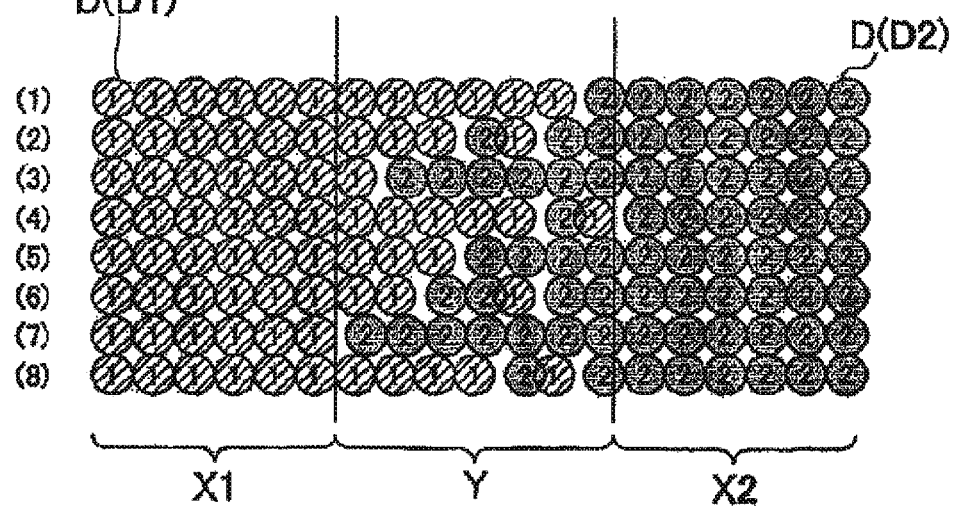
Figure 10A:
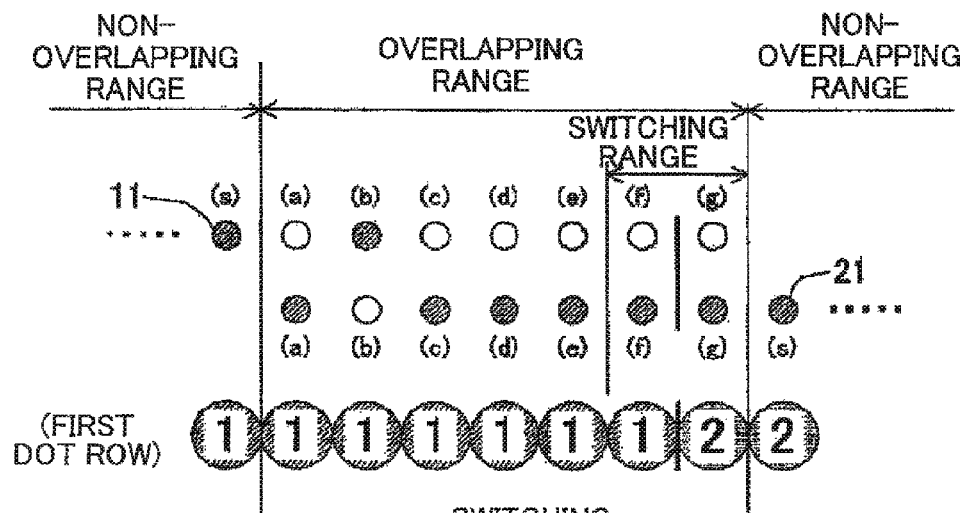
FIGS. 10A, 10B and 10C are diagrams showing a relationship between two nozzle rows and the dot-row of the first modified embodiment.
Figure 10B:
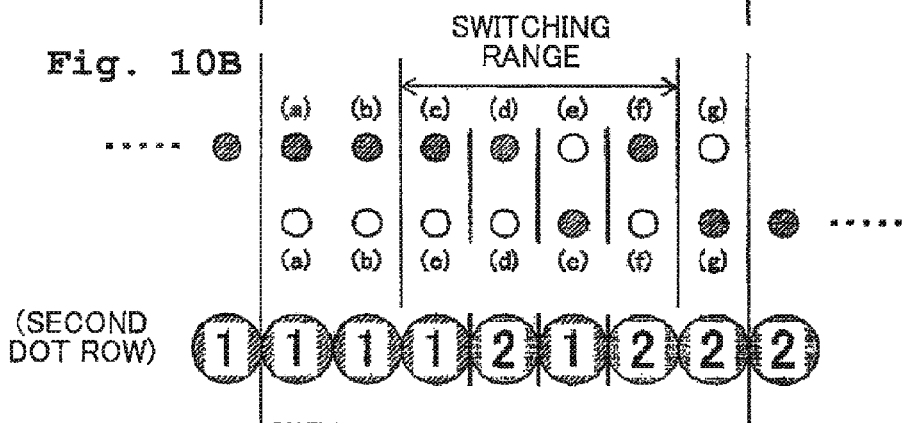
Figure 10C:
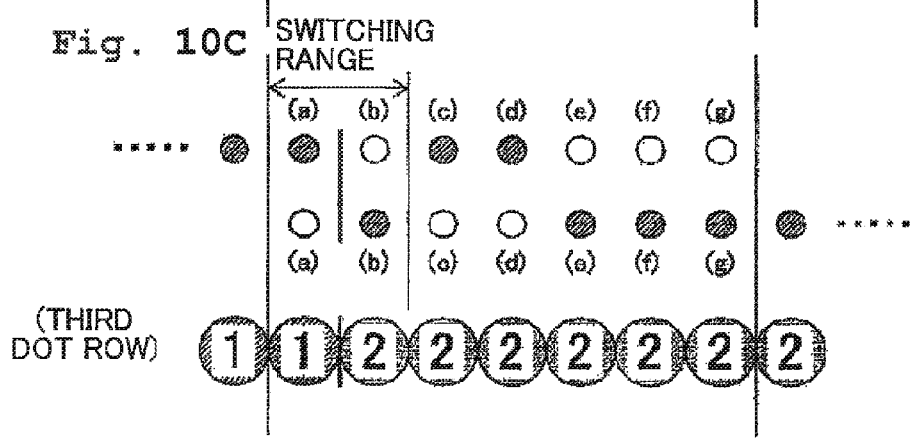

The example 2 is an example corresponding to the modified embodiment 1 in FIG. 9.

For some dot-rows, there are three switching positions in the switching range. For the remaining dot-rows, there is one switching position.

For all dot-rows, the switching range is narrower than the overlapping range.

For all dot-rows, the switching range differs for the adjacent dot-rows.

c) Comparative Example

Figure 6C:
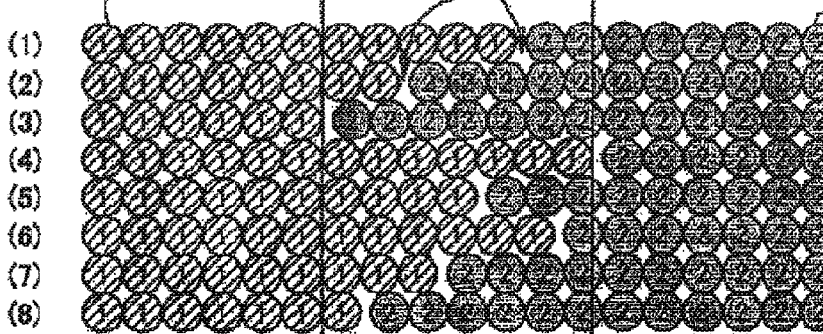

The comparative example is an example corresponding to the embodiment for comparison 1 in FIG. 6.

For all dot-rows, there is one switching position in the switching range.

For all dot-rows, the switching range is narrower than the overlapping range.

For all dot-rows, the switching range differs for the adjacent dot-rows.

Figure 16:
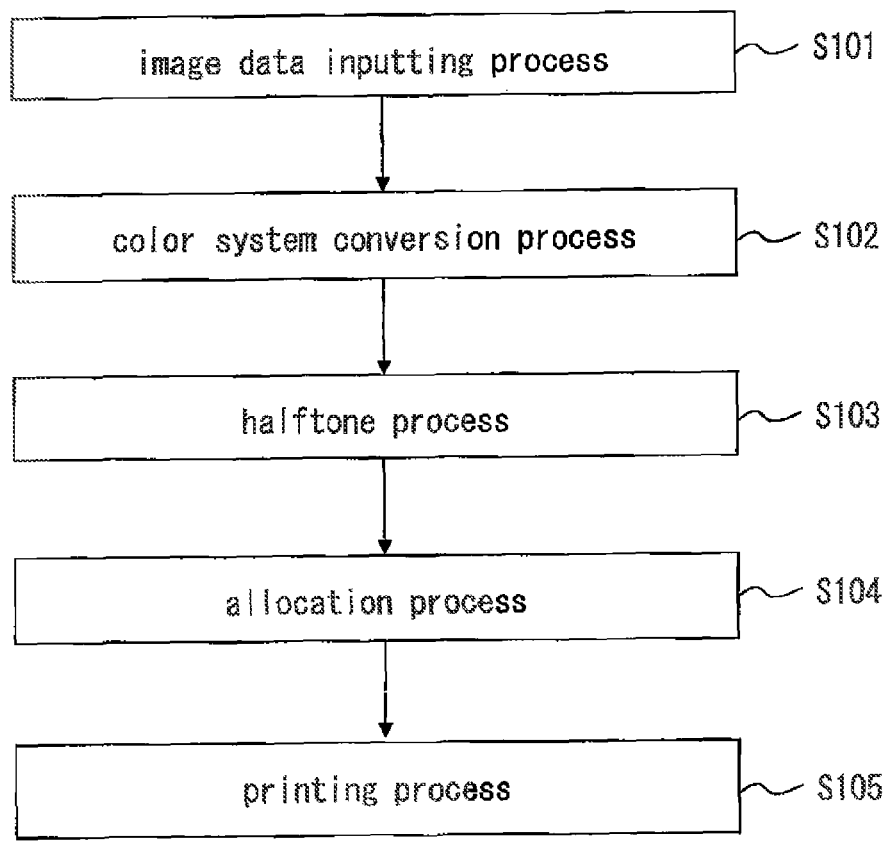
FIG. 16 is a flowchart showing the control for forming the images.

The abovementioned patterns are formed under the recording conditions as described above. Details of the image-formation is explained below with reference to the flowchart as shown in FIG. 16. At first, an image data inputting process is performed (S101). In the image data inputting process, the control unit 6 obtains image data from an external apparatus such as the PC 35. Note that the control unit 6 may receive the image data from a memory card slot provided in the ink-jet printer 1. Then a color system conversion process is performed (S102). In the color system conversion process, the control unit 6 converts the color system of the obtained image from an ROB color system to a CMYK color system. Then a halftone process is performed (S103). In the halftone process, the image data is converted into data including dot-ON/dot-OFF data of each dot. In the halftone process, the dot-ON/dot-OFF data of each dot may be a two-valued data indicating whether dot exists or not, or may be a multiple-valued data indicating dot-ON/dot-OFF and sizes of the dot. In the halftone process, the image gradation of the image data (for example, 256 tones) is converted into tones that is available in the ink-jet printer 1. Then an allocation process is performed (S104). In the allocation process, the control unit 6 determines an allocation of the nozzles of jetting the ink in the overlapping range, based on mask-data stored in the ink-jet printer 1. In other words, the control unit 6 determines how to switch jetting the ink from the first nozzles and jetting the ink from second nozzles in the overlapping range, based on mask-data stored in the ink-jet printer 1. The mask-data includes the information as to "which head units do jet the ink to form a certain dot in the dot rows in the overlapping range". In other words, the mask-data includes information as to whether one of the first nozzles is used to form the certain dot in the dot rows in the overlapping range or whether one of the second nozzles is used to form the certain dot in the dot rows in the overlapping range. For example, the mask-data may be stored in the ROM 32 (see the mask for the first head unit 32a, and the mask for the second head unit 32b as shown in FIG. 2). Then a printing process is performed (S105). In the printing process, images such as the abovementioned patterns are formed by switching or alternating the nozzles of jetting the ink between the first nozzles and the second nozzles in the overlapping range.

[Judgment Method]

For each of the example 1, the example 2, and the comparative example, the abovementioned 342 patterns have been formed. A visual check was carried out for each of the 342 patterns, and quality was judged in four stages by organoleptic evaluation (sensory assessment). Judgment standards are as follow.

++: extremely favorable with a position of joint unnoticeable.
+: a position of joint noticeable, but favorable and acceptable.
−: judgment of whether acceptable or not is difficult.
×: unacceptable

[Judgment Result]

Figure 17A:
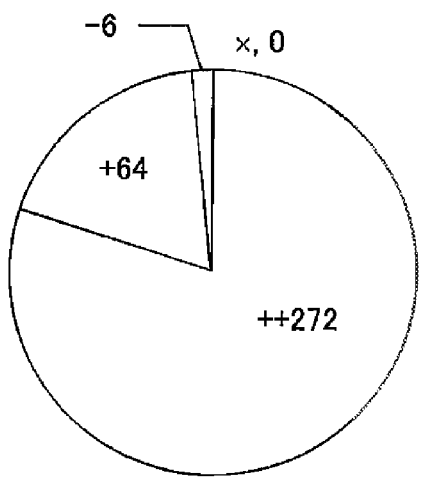
FIGS. 17A, 17B and 17C are diagrams showing a judgment result by an organoleptic evaluation (sensory assessment) of the example 1, the example 2, and the comparative example.
Figure 17B:
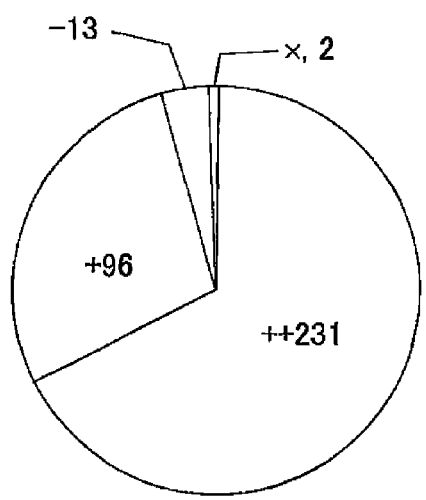
Figure 17C:
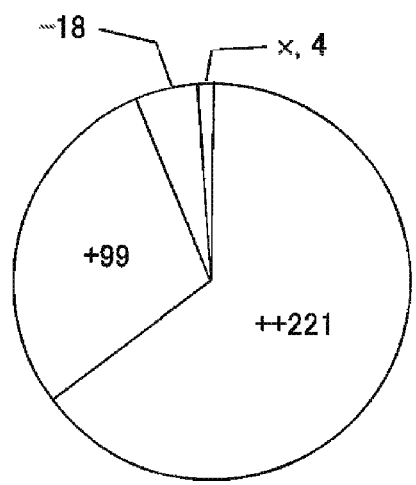

The judgment result is shown in FIGS. 17A to 17C. In the example 1, approximately 80% of the total number of patterns has been judged to be ++ (extremely favorable). ++ and + combined together is about 98%. Whereas, the number of × (unacceptable) is zero. In the first example, it is revealed that the print quality of a joint is extremely high. On the other hand, in the comparative example, the number of patterns judged to be ++ (extremely favorable) is limited to less than 70%. Moreover, the number of patterns judged to be × (unacceptable) is four. In such manner, it is evident that in the comparative example, in some cases, the print quality of a joint is degraded according to the pattern. Moreover, in the example 2, although the print quality is inferior to the print quality in the example 1, a print quality higher as compared to the print quality in the comparative example has been achieved.

What is claimed is:

1. A liquid jetting apparatus configured to jet a liquid onto a recording medium, comprising:
   a head unit in which a plurality of nozzles are aligned at an interval in a nozzle-row direction to form a nozzle row; and
   a controller configured to control a liquid jetting operation of the head unit to jet the liquid, from a part of the plurality of the nozzles belonging to a first range and another part of the plurality of nozzles belonging to the second range, toward the recording medium to form a plurality of dot-rows arranged in a direction of intersection which intersects the nozzle-row direction, wherein each of the dot-rows includes a switching range in which jetting the liquid from the part of the nozzles belonging to the first range and jetting the liquid another part of nozzles belonging to the second range are switched at a plurality of switching positions,
   wherein the plurality of dot-rows are formed so that:
      the switching range in which the nozzles in the first range and the nozzles in the second range are switched, becomes narrower than the first range and the second range;
      the switching positions are set such that, at the time of forming at least a part of the dot-rows in the plurality of dot-rows, there are three or more than three switching positions of the nozzles in the first range and the nozzles in the second range, in the switching range; and
      the switching range is set such that, the switching range differs for the two dot-rows which are adjacent in the direction of intersection.

2. The liquid jetting apparatus according to claim 1, wherein the head unit includes a first head unit in which a plurality of first nozzles are aligned at the interval in the nozzle-row direction to form a first nozzle row, and a second head unit in which a plurality of second nozzles are aligned at the interval in the nozzle-row direction to form a second nozzle row, and
   the first head unit includes a plurality of nozzles belonging to the first range, and the second head unit includes a plurality of nozzles belonging to the second range, and
   the first head unit and the second head unit are arranged at different positions in the direction of intersection, in a state of the first range of the first nozzle row and the second range of the second nozzle row being overlapped, in the direction of intersection, and
   positions of the plurality of first nozzles in the nozzle-row direction coincide with positions of the plurality of second nozzles in an overlapping range in which the first nozzle row and the second nozzle row overlap in the nozzle-row direction.

3. The liquid jetting apparatus according to claim 2, wherein the controller is configured to control the first head unit and the second head unit such that there are three or more than three switching positions of the switching range for all the dot-rows.

4. The liquid jetting apparatus according to claim 2, wherein the controller is configured to control the first head unit and the second head unit such that the switching range differs for two adjacent dot-rows in the direction of intersection, for all the dot-rows.

5. The liquid jetting apparatus according to claim 4, wherein the controller is configured to control the first head unit and the second head unit such that all the switching positions in the switching range differ for the adjacent dot-rows in the direction of intersection, for all the dot-rows.

6. The liquid jetting apparatus according to claim 1, further comprising:
- a scanning mechanism configured to hold the head unit, and to scan together with the head unit in the direction of intersection; and
- a transporting mechanism configured to transport the recording medium in a transporting direction which is orthogonal to the direction of intersection,
- wherein the first range is positioned at the most upstream side of the transporting direction, and the second range is positioned at the most downstream side of the transporting direction, and
- the controller is configured to control the head unit to form the plurality of dot-rows, in a first scanning, by jetting the liquid from the plurality of nozzles belonging to the first range, and to form the plurality of dots by jetting the liquid from the plurality of nozzles belonging to the second range, in a second scanning which follows the first scanning.

7. A recording method using a liquid jetting apparatus which includes a head unit in which a plurality of nozzles are aligned at an interval in a nozzle-row direction to form a nozzle row, and a controller configured to control a liquid jetting operation of the head unit, comprising:
- jetting the liquid, from a part of the plurality of the nozzles belonging to a first range and another part of the plurality of nozzles belonging to the second range, toward the recording medium to form a plurality of dot-rows arranged in a direction of intersection which intersects the nozzle-row direction, wherein each of the dot-rows includes a switching range in which jetting the liquid from the part of the nozzles belonging to the first range and jetting the liquid another part of nozzles belonging to the second range are switched at a plurality of switching positions,
- wherein the plurality of dot-rows are formed so that:
  - the switching range in which the nozzles in the first range and the nozzles in the second range are switched, becomes narrower than the first range and the second range;
  - the switching positions are set such that, at the time of forming at least a part of the dot-rows in the plurality of dot-rows, there are three or more than three switching positions of the nozzles in the first range and the nozzles in the second range, in the switching range; and
  - the switching range is set such that, the switching range differs for the two dot-rows which are adjacent in the direction of intersection.

8. The method of recording by ink-jet printer according to claim 7, wherein the head unit of the liquid jetting apparatus includes a first head unit in which a plurality of first nozzles are aligned at the interval in the nozzle-row direction to form a first nozzle row, and a second head unit in which a plurality of second nozzles are aligned at the interval in the nozzle-row direction to form a second nozzle row, and
- the first head unit includes a plurality of nozzles belonging to the first range, and the second head unit includes a plurality of nozzles belonging to the second range, and
- the first head unit and the second head unit are arranged at different positions in the direction of intersection, in a state of the first range of the first nozzle row and the second range of the second nozzle row being overlapped, in the direction of intersection, and
- positions of the plurality of first nozzles in the nozzle-row direction coincide with positions of the plurality of second nozzles in an overlapping range in which the first nozzle row and the second nozzle row overlap in the nozzle-row direction, and
- in the recording method, at the time of forming the plurality of dot-rows which are arranged in the direction of intersection intersecting the nozzle-row direction by jetting the liquid from the first nozzle row and the second nozzle row, the nozzles jetting the inks are switched between the first nozzles and the second nozzles, in the overlapping range.

* * * * *